(12) United States Patent
Mensching et al.

(10) Patent No.: US 7,139,894 B1
(45) Date of Patent: Nov. 21, 2006

(54) SYSTEM AND METHODS FOR SHARING CONFIGURATION INFORMATION WITH MULTIPLE PROCESSES VIA SHARED MEMORY

(75) Inventors: Rob Martin Mensching, Redmond, WA (US); Michael R. Marcelais, Redmond, WA (US); Marcin Szuster, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 498 days.

(21) Appl. No.: 10/661,721

(22) Filed: Sep. 12, 2003

(51) Int. Cl.
*G06F 12/00* (2006.01)
*G06F 13/00* (2006.01)
*G06F 17/30* (2006.01)
*G06F 11/00* (2006.01)

(52) U.S. Cl. ............... 711/170; 711/147; 711/148; 711/149; 711/150; 711/151; 711/152; 711/153; 707/201; 714/15

(58) Field of Classification Search ............... None
See application file for complete search history.

(56) References Cited

U.S. PATENT DOCUMENTS

| | | | |
|---|---|---|---|
| 5,297,262 A | 3/1994 | Cox et al. | 395/325 |
| 5,553,287 A | 9/1996 | Bailey et al. | 395/650 |
| 5,875,479 A | 2/1999 | Blount et al. | 711/162 |
| 6,016,495 A | 1/2000 | McKeehan et al. | 707/103 |
| 6,631,478 B1 * | 10/2003 | Wang et al. | 714/15 |
| 6,671,699 B1 * | 12/2003 | Black et al. | 707/201 |
| 2002/0059425 A1 | 5/2002 | Belfiore et al. | 709/226 |

* cited by examiner

*Primary Examiner*—Mano Padmanabhan
*Assistant Examiner*—Mardochee Chery
(74) *Attorney, Agent, or Firm*—Merchant & Gould

(57) ABSTRACT

A system and methods for sharing configuration information with multiple services, or processes, via shared memory. The configuration information, typically, comprises runtime information utilized by processes during operation, including without limitation, information describing data communication connections between the local computer and other computing resources (i.e., port and wire information), and information defining numeric values or character string values (i.e., genre and record information). The system architecture includes a plurality of APIs which: reside at the local computer; populate, manage, and control access to a shared memory containing the configuration information; and, are executable only by processes executing at the local computer, thereby limiting access to the shared memory. Access to the configuration information is further limited to only those processes identified as having appropriate permission. The methods enable the configuration information of the shared memory to be modified during local computer operation and without impeding access to the configuration information.

28 Claims, 19 Drawing Sheets

SYSTEM AND METHODS FOR SHARING CONFIGURATION INFORMATION WITH MULTIPLE PROCESSES VIA SHARED MEMORY

TECHNICAL FIELD

The present invention relates, generally, to shared memory systems and methods, and, more particularly, to shared memory systems and methods for storing configuration information for server-side services.

BACKGROUND OF THE INVENTION

In computing systems, computer processes and services commonly require configuration values and connection strings for operation. Computer services are often dispersed in various configuration files, registry values, web pages, or data source name (DSN) entries. Computer processes and services commonly require configuration files to store process and service settings. When processes and services are installed onto a computer, a configuration file is created to define values of certain parameters necessary for the process and service to function correctly. During execution, the process or service accesses the configuration file to retrieve the appropriate parameters. Such configuration files commonly include initialization files, management information format files, and the registry. The registry, for example, is a central database that stores information in a hierarchy in order to allow the system to accommodate one or more users, processes, or hardware devices. Processes and services constantly access the registry to reference, for example, user profiles, a list of processes installed on the system and the document types each process can utilize, property sheet settings, a list of hardware connected to the system, and a list of accessible ports.

While storing configuration values and connection strings in registry values, data files, web pages, and data source name entries satisfies the needs for such information, computer systems typically depend on configuration files that are designed specifically for processes or services and that may reside on remote systems. The specifically designed configuration files do not allow for real-time updates thereof without service interruption, do not allow immediate access to configuration values, and do not enable uniformity between different services. Computing systems, particularly server systems, require immediate access to configuration values and connection strings in order to provide acceptable response times to client side requests.

Computer systems that share memory between multiple processes or services require a mechanism to protect the integrity of the shared resources. Computer systems often lock files being accessed or updated to ensure mutually exclusive access to the files. The locking of files prevents two services from modifying a file at the same time which might lead to corrupted data in the files. A downside of locking files is that when another service needs to access the file, the service may have to wait until the file has been unlocked by the first service. Additionally, multiple users on the same computer system present security problems with shared memory and the data stored therein. The shared memory must not allow unauthorized users to access sensitive data.

Accordingly, there is a need in the art for a unified system and method for storing server-side configuration data for multiple computer services.

There is also a need in the art for a unified system and method for updating server-side configuration data for multiple computer services while ensuring that data updates do not interrupt services accessing the configuration data.

Additionally, there is a need in the art for a system and method to manage non-locked shared memory to store settings for multiple processes.

Further, there is a need in the art for a system and method for controlling access to portions of shared memory data to particular computer accounts.

SUMMARY OF THE INVENTION

Broadly described, the present invention comprises a system for facilitating configuration information sharing with a plurality of processes or services via non-locked shared memory. More particularly, the present invention comprises a system for creating, accessing, updating, securing, and managing non-locked shared memory and methods which: (1) allocate a region of computer memory for storing configuration information potentially accessible to a plurality of processes or services; (2) receive and store initial configuration information in the allocated memory; (3) insert or update configuration information without impeding access to the configuration information by the plurality of processes or services; (4) provide configuration information to the plurality of processes or services; and (5) secure the allocated memory so that only certain processes or services have access to certain configuration information.

Advantageously, the present system provides secure shared memory because the system architecture allows access to shared memory only by processes or services actually running on the computer system where the shared memory resides. Generally, configuration information persists on a database protected from outside systems via a secured communication link and firewall. Only the operator may update or add information to the database which is then propagated to the shared memory on the target computer systems. Additionally, the system provides read-only application processing interfaces, thus protecting the integrity of configuration information in shared memory. The present invention further protects configuration information by creating memory sections that are accessible only by certain processes or applications identified in an access control list.

The present invention also provides real-time updating of shared memory without interrupting or impeding access to the shared memory by processes and services. During the real-time updating, processes and services use original configuration information until the updated configuration information is identified as being usable. Thereafter, processes and services access the updated configuration information from shared memory. Using a "bottom-up" approach, shared memory may be modified in real-time while providing a seamless transition between the original configuration information and the updated configuration information.

The configuration information accessible in shared memory generally includes runtime information utilized by processes or services during operation, including but not limited to, data communication connection information between the computer system in which the shared memory is present (i.e., the local computer system) and other computing resources (i.e., port and wire information), and numeric or character string information specific to a particular service or process (i.e., genre and record information). Therefore, the present invention eliminates the scattering of configuration information for services and processes throughout various registry values, data files, web pages, or DSN entries.

Other features and advantages of the present invention will become apparent upon reading and understanding the present specification when taken in conjunction with the appended drawings.

DETAILED DESCRIPTION OF THE INVENTION

Figure 1:
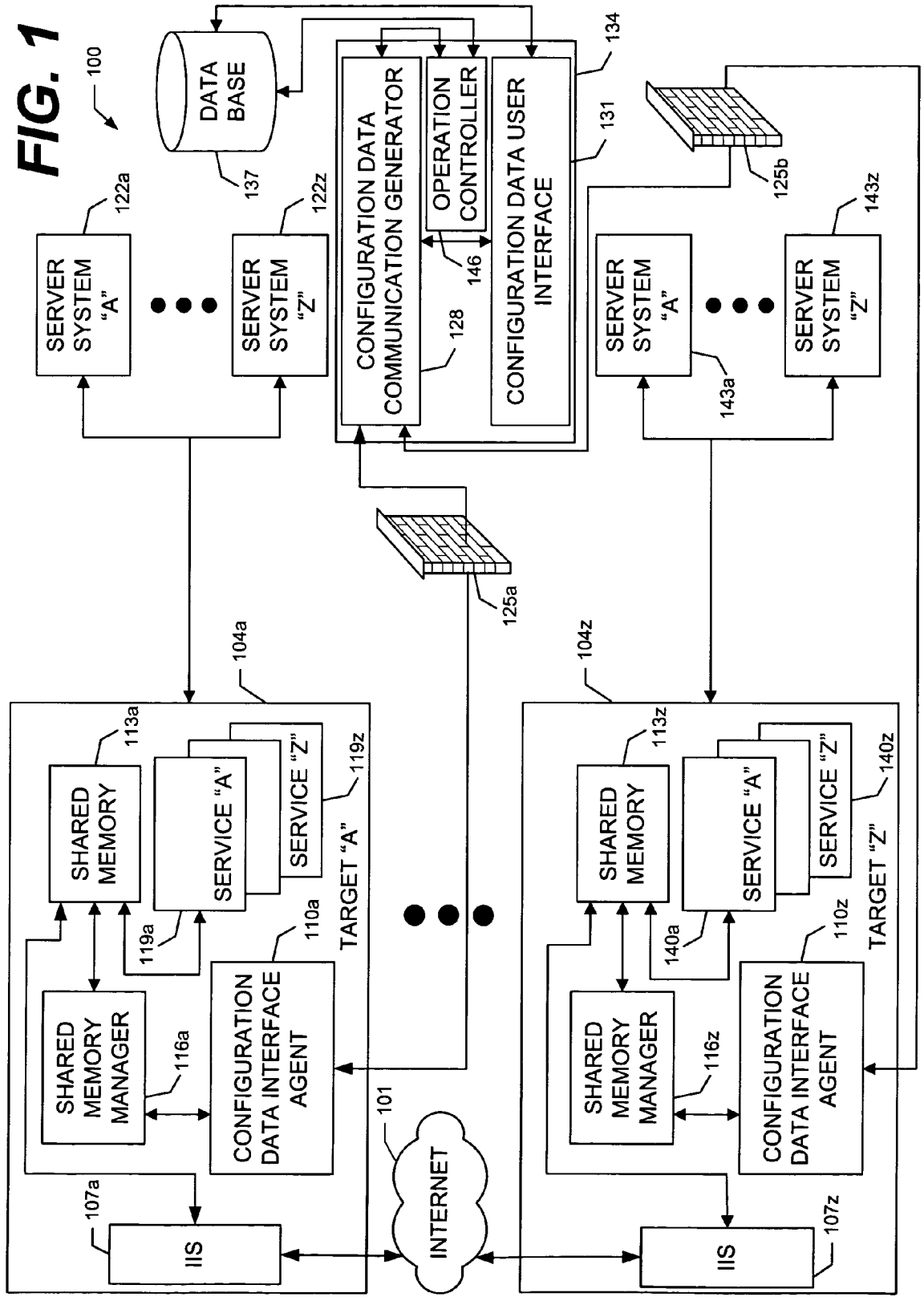
FIG. 1 displays a block diagram representation of a network environment on which the invention is implemented in accordance with an exemplary embodiment of the present invention.

Referring now to the drawings, in which like numerals represent like components or steps throughout the several views, FIG. 1 displays a block diagram representation of a network environment 100 on which the invention is implemented in accordance with an exemplary embodiment of the present invention. The network environment 100 comprises an operator system 134 residing at a first location. The operator system 134 is configured with hardware and software (see FIG. 2) appropriate to perform tasks and provide capabilities and functionality as described herein. The operator system 134 comprises a configuration data communication generator 128, a configuration data user interface 131, and an operation controller 146.

The configuration data user interface 131 provides an operator or administrator with a user interface to add or modify data, such as configuration data, which is stored in a database 137, described below. In the exemplary embodiment of the present invention, the configuration data user interface 131 comprises program modules or machine instructions that perform the above-described tasks when executed on the operator system's 134 central processing unit (CPU).

The configuration data user interface 131 connects communicatively to the configuration data communication generator 128. The configuration data communication generator 128 is adapted to receive data, such as configuration data, from the configuration data user interface 131. In the exemplary embodiment of the present invention, the configuration data communication generator 128 comprises program modules or machine instructions that perform certain tasks when executed by the CPU. Additionally, the configuration data communication generator 128 creates executable machine instructions or code which incorporates the configuration data received from the configuration data user interface 131. The generated code is then sent to target systems 104a, 104z, described below, for configuration data updates. The configuration data communication generator 128 connects communicatively to target systems 104a, 104z. Preferably, the configuration data communication generator 128 connects to the target systems 104a, 104z via a secure communication link and through a firewall 125a, 125b, described below. Such connection is generally established via a typical network protocol. For example, and not limitation, the configuration data communication generator 128 connects to the target systems 104a, 104z using the simple object access protocol (SOAP) to exchange structured and type information via the network environment 100. In the exemplary embodiment of the present invention, the executable machine instructions or code generated by the configuration data communication generator 128, described above, is implemented in extensible markup language (XML).

The operation controller 146 connects communicatively to the database 137 and the configuration data communication generator 128. The operation controller 146 is adapted to receive data from the database 137 and provide data to the configuration data communication generator 128. In the exemplary embodiment of the present invention, the operation controller 146 comprises program modules or machine instructions that perform certain tasks when executed by the CPU. For example, and not limitation, the operation controller 146 determines whether a target system's 104a, 104z shared memory 113a, 113z, described below, is empty (i.e., because the target system just entered the network after reboot or because the target system is a newly added system). If such a determination is made, the operation controller 146 retrieves data from the database 137 to provide to the configuration data communication generator 128, which in turn provides the data to the appropriate target system 104a, 104z. The method of determining whether a target system 104a, 104z is empty and then providing appropriate data accordingly is described below with reference to FIG. 7.

The operator system 134 connects communicatively to a database 137 which stores data. The database 137 is a memory device capable of storing and retrieving data including, but not limited to, random access memory (RAM), flash memory, magnetic memory devices, optical memory devices, hard disk drives, removable volatile or non-volatile memory devices, optical storage mediums, magnetic storage mediums, or RAM memory cards. Alternatively, the database 137 may be a remote storage facility accessible through a wired and/or wireless network system. Additionally, the database 137 may be a memory system comprising a multi-stage system of primary and secondary memory devices, as described above. The primary memory device and secondary memory device may operate as a cache for the other or the second memory device may serve as a backup to the primary memory device. In yet another example, the database 137 may be a memory device configured as a simple database file. The database 137 is preferably implemented as a searchable, relational database using a structured-query-language (SQL). Typically, the database 137 stores the persisted configuration data and connection strings for the services 119a, 119b, 140a, 140z located on the target system 104a, 104z.

In the exemplary embodiment of the present invention, the network environment 100 comprises a plurality of target systems 104a, 104z residing at multiple locations. The target systems 104a, 104z are configured with hardware and software (see FIG. 2) appropriate to perform tasks and provide capabilities and functionality as described herein. Each target system 104a, 104z comprises a web server, such as Internet Information Server (IIS) 107a, 107z; shared memory 113a, 113z; a shared memory manager 116a, 116z; a configuration data interface agent 110a, 110z; and a plurality of services 119a, 119z, 140a, 140z. The ellipsis between target system "A" 104a and target system "Z" 104z illustrates that a plurality of target systems may exist in the network environment 100 and, therefore, the network environment 100 is not limited to two target systems as shown in FIG. 1.

The IIS 107a, 107z connects communicatively to a remote network such as, but not limited to, the Internet 101 or a local area network (LAN). One skilled in the art will recognize that the IIS 107a, 107z is a web server designed to deliver web documents to remote clients that request such web documents. IIS 107a, 107z is a web server designed to run on "WINDOWS NT®" platforms available from Microsoft Corporation of Redmond, Wash. Additionally, the IIS 107a, 107z connects communicatively to the shared memory 113a, 113z.

The shared memory manager 116a, 116z connects communicatively to the shared memory 113a, 113z which contains data, such as configuration data. The shared memory manager 116a, 116z comprises program modules or machine instructions that perform certain tasks when executed by the CPU. In the exemplary embodiment of the present invention, the shared memory manager 116a, 116z handles all requests for data residing in shared memory 113a, 113z. Additionally, the shared memory manager 116a, 116z updates and adds data to the shared memory 113a, 113z. In the exemplary embodiment of the present invention, the shared memory manager 116a, 116z only updates and adds data to the shared memory 113a, 113z if requested by the configuration data interface agent 110a, 110z, described below, otherwise the shared memory manager 116a, 116z only provides read access to the shared memory 113a, 113z.

The shared memory 113a, 113z stores data and provides data to the shared memory manager 116a, 116z. In the exemplary embodiment of the present invention, the shared memory 113a, 113z is a volatile memory device (often called main memory) capable of storing and retrieving data including, but not limited to, random access memory (RAM), or any other memory device that provides rapid storing and retrieving of data. The data residing in shared memory 113a, 113z includes, but is not limited to, configuration data, ports, wires, genres, records, or permission schemas. Additionally, the shared memory 113a, 113z maintains configuration data, ports, and wires relevant to the local target system 104a, 104z. Therefore, the content of shared memory 113a, 113z across the network environment 100 differs for each target system 104a, 104z.

The plurality of services 119a, 119z, 140a, 140z include, but are not limited to, program modules, applications, machine instructions, software code, or any combination thereof. Generally, services 119a, 119z, 140a, 140z perform tasks and provide desirable capabilities in order to reach a specific result. Services 119a, 119z, 140a, 140z typically require system resources and configuration data to perform properly. In addition, services 119a, 119z, 140a, 140z may require access to back-end functionality provided on various server systems (also called resources) 122a, 122z, 143a, 143z. The services 119a, 119z, 140a, 140z connect communicatively to the shared memory 113a, 113z. For example, and not limitation, if a service needs configuration data or a connection to a server system, the service 119a, 119z, 140a, 140z sends a request to the shared memory 113a, 113z for such data. The target system 104a, 104z may contain a plurality of services 119a, 119z, 140a, 140z and, therefore, should not be limited to the number of services shown in FIG. 1.

Server systems 122a, 122z, 143a, 143z may be configured with hardware and software (see FIG. 2) appropriate to perform tasks and provide capabilities and functionality as described herein. Server systems 122a, 122z, 143a, 143z typically provide back-end support to the services 119a, 119z, 140a, 140z running on the target systems 104a, 104z. Each server system 122a, 122z, 143a, 143z may contain differing support program modules, applications, software, or hardware. For example, one server system may contain billing software, while another server system contains authentication software. In the exemplary embodiment of the present invention, services 119a, 119z, 140a, 140z connect to server systems 122a, 122z, 143a, 143z for support and functionality.

The configuration data interface agent 110a, 110z connects communicatively to the shared memory manager 116a, 116z. The configuration data interface agent 110a, 110z provides data, such as configuration data, to the shared memory manager 116a, 116z, which then updates shared memory 113a, 113z. Additionally, the configuration data interface agent 110a, 110z connects communicatively to the operator system 134 via a secured communication link. A secure communication link can be established by encrypting any communication through the secure communication link using secure sockets layer (SSL). In the exemplary embodiment of the present invention, the operator system 134 provides a communication, comprising configuration data from the database 137, to the configuration data interface agent 110*a*, 110*z* which then interprets the communication and provides the configuration data to the shared memory manager 116*a*, 116*z* for storing into shared memory 113*a*, 113*z*. Generally, only the configuration data interface agent 110*a*, 110*z* has access to the write-enabled APIs used to write data to shared memory 113*a*, 113*z*.

The target system 104*a*, 104*z* and the operator system 134 are separated by a firewall 125*a*, 125*b*. Typically, a firewall 125*a*, 125*b* is a system designed to prevent unauthorized access to a computer system or network and may be implemented by hardware, software, or a combination thereof. A firewall 125*a*, 125*b* assists in making a connection between two systems secure.

One skilled in the art will recognize that connecting communicatively may include any appropriate type of connection including, but not limited to, analog, digital, wireless and wired communication channels. Such communication channels include, but are not limited to, copper wire, optical fiber, radio frequency, infrared, satellite, or other media.

In an alternative embodiment of the present invention, the target systems 104*a*, 104*z* may not be in communication with an operator system 134. In such a configuration, the configuration data interface agent 110*a*, 110*z* does not receive configuration data from the database 137 via the configuration data communication generator 128. Instead, configuration data is retrieved from the local registry of the target system 104*a*, 104*z*. To change data in the shared memory 113*a*, 113*z*, the values in the registry of the target system 104*a*, 104*z* may be modified by an operator.

Figure 2:
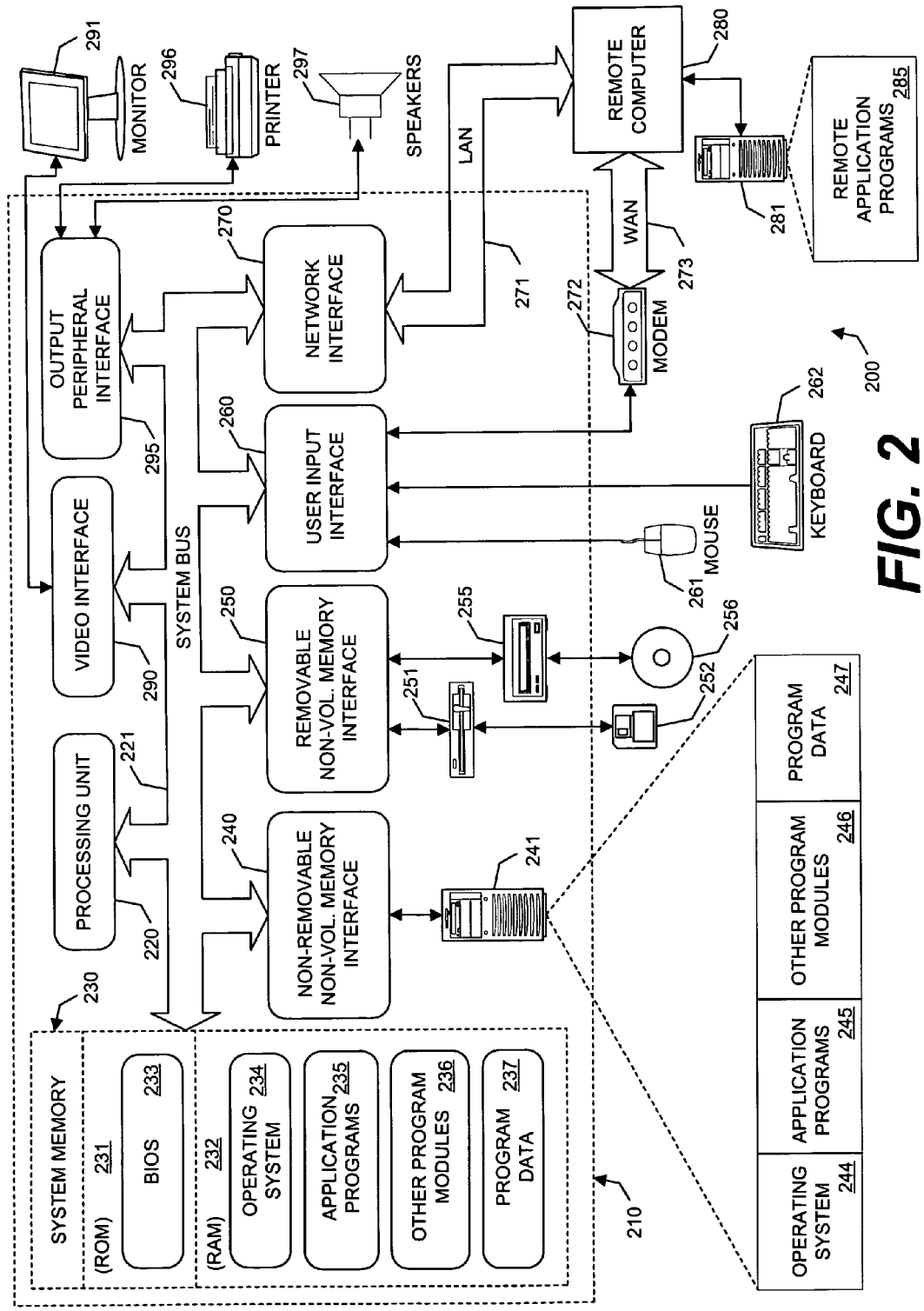
FIG. 2 displays a block diagram representation of a system environment on which the invention is implemented in accordance with an exemplary embodiment of the present invention.

FIG. 2 illustrates an example of a suitable computing system environment 200 on which the invention is implemented. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, or data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 210. Components of computer 210 may include, but are not limited to, a processing unit 220, a system memory 230, and a system bus 221 that couples various system components including the system memory 230 to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus 221, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

Figure 3:
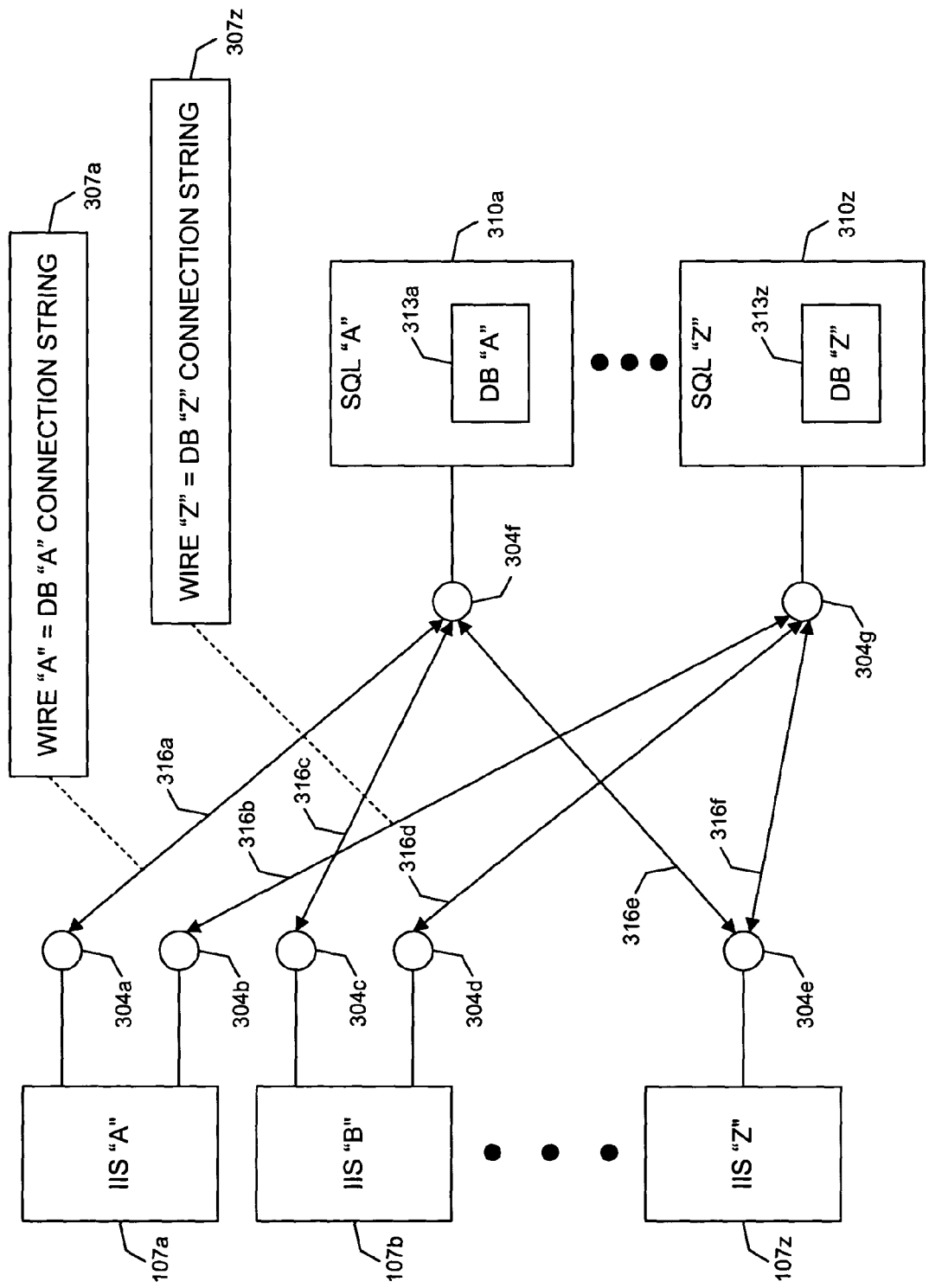
FIG. 3 displays a block diagram representation illustrating ports and wires modeling of the communication links between multiple resources in accordance with an exemplary embodiment of the present invention.

FIG. 3 displays a block diagram representation illustrating ports and wires modeling of the communication links between multiple resources in accordance with an exemplary embodiment of the present invention. As discussed above with regard to FIG. 1, a target system 104*a*, 104*z* comprises an IIS 107*a*, 107*b* that assists in facilitating communications to remote networks. Such remote networks may include connections to server systems 122*a*, 122*z*, 143*a*, 143*z* as described above. FIG. 3 illustrates, by way of example, the connection ("ports" and "wires") between the target systems 104*a*, 104*z* and the server systems (also called resources) 122*a*, 122*z*, 143*a*, 143*z*.

In the exemplary embodiment of the present invention, the target system 104*a*, 104*z*, illustrated by IIS 107*a*, 107*b*, 107*z* in FIG. 3, comprise at least one port 304*a*–304*e*. The ports 304*a*–304*e* comprise at least one wire 316*a*–316*f* that facilitates a connection to an outside resource, such as a server system 122*a*, 122*z*, 143*a*, 143*z*. A single port 304*a*–304*e* can comprise multiple wires 316*a*–316*f*. As illustrated in FIG. 3, the server systems 122*a*, 122*z*, 143*a*, 143*z* may be systems comprising SQL systems 310*a*, 310*z*. The SQL systems 310*a*, 310*z* comprise databases 313*a*, 313*z* providing access to various data. Like the target systems 104*a*, 104*z*, the server systems 122*a*, 122*z*, 143*a*, 143*z*, illustrated by SQL systems 310*a*, 310*z* in FIG. 3, comprise at least one port 304*f*, 304*g*. The IIS ports 304*a*–304*e* connect to the SQL ports 304*f*, 304*g* via a connection string or wire 316*a*–316*f*. For example, if IIS "A" 107*a* wishes to retrieve data in database "Z" 313*z* then IIS "A" 107*a* must create a wire between IIS port 304*b* and SQL port 304*g*. A wire is created by utilizing the correct connection string. Boxes 307*a*, 307*z* in FIG. 3 provide a description of the connection strings associated with the wires 316*a*–316*f*. In the previous example, wire 316*b* must use the connection string for database "Z" 313*z*, as described in box 307*z*, to create a connection between IIS "A" 107*a* and SQL "Z" 310*z*.

Generally, "ports" and "wires" store connection information between available resources within the network environment 100. Ports 304*a*–304*g* are abstract concepts of connection ports between two systems and are stored in shared memory 113*a*, 113*z*. Through a virtual topology, ports 304*a*–304*g* provide a conceptual model for storing relevant information between systems. A port 304*a*–304*g* may comprise of a plurality of wires 316*a*–316*f* that are used with an appropriate protocol to make a connection to another port. Ports 304*a*–304*g* allow global or local wire updates. Global wire updates affect all systems within the network environment 100 that use the updated port 304*a*–304*g*. Local wire updates allow a particular port 304*a*–304*g* on one system to be updated, while not updating other systems using the same port. For example, it may be necessary for a new target system 104*a* to use a test server system 122*a* for debugging. Accordingly, a local wire update can be used to change the port configuration of the new target system 104*a* without affecting the similar port used by other systems. As described above, ports 304*a*–304*g* are stored in shared memory 113*a*, 113*z*, therefore, ports can only be added or updated via the configuration data interface agent 110*a*, 110*z*.

Ports 304*a*–304*g* contain various data elements including, but not limited to, port name, appropriate protocol, state, port type, and revision number. In the exemplary embodiment of the present invention, port names have a character limit, such as thirty-one characters, for increasing lookup speeds. Generally, there are two types of ports: client and server. Client ports belong to any system that acts as a client with regard to the resource wire to be connected. Likewise, server ports belong to any system that acts as a server (or is the destination) with regard to a resource wire to be connected. Client ports comprise wires 316a–316f that the client system can use to connect. Server ports comprise wires 316a–316f that the server system permits to connect. Preferably, the services 119a, 119z, 140a, 140z residing on the target systems 104a, 104z request resources on other systems and, therefore, utilize client ports. The state (or hint) of a port 304a–304g include, but are not limited to, read, write, and dead. Read ports indicate that the associated wires are read-only. Write ports indicate that the associated wires are write-enabled. Dead ports indicate that all associated wires do not respond and cannot be used to create a successful connection. The appropriate protocol of a port 304a–304g designates the type of protocol used by the port to make a connection. Appropriate protocols include, but are not limited to, hypertext transfer protocol (HTTP), tabular data stream protocol (TDS), server message block protocol (SMB), and remote procedure call protocol (RPC). Each port has only one port type and generally uses one appropriate protocol. The revision number changes when a wire within a port is added or updated. The revision number provides an immediate determination whether the port has been changed.

Wires 316a–316f connect two ports together. The wires 316a–316f contain allowable connection strings used by the ports 304a–304g. Wires 316a–316f contain various data elements including, but not limited to, wire id, wire value, and wire state. Generally, the wire id is an indexed integer value and the wire value is a string. Wire ids are only unique within a particular port 304a–304g and, therefore, are not unique within the network environment 100. The states of a wire 316a–316f include, but are not limited to, read, write, and dead. Read wires indicate that the target resource is read-only. Write wires indicate that the target resource is write-enabled. Dead wires indicate that the wire does not respond and cannot be used to create a successful connection. Wires 316a–316f are designated as dead when services 119a, 119z, 140a, 140z cannot connect to a server system 122a, 122z, 143a, 143z via the connection string. For example, the operator of the operator system 134 may designate a wire 316a–316f as dead in the database 137, which then propagates to the target systems 104a, 104z, the method described below.

In an alternative embodiment of the present invention, the target systems 104a, 104z further comprise a local service that periodically checks all of the local ports and tests all of the wires. Then, the local service may update the port and wire types automatically through the configuration data interface agent 110a, 110z. In yet another embodiment, the operator system 134 further comprises of a service that remotely checks all of the ports and tests all of the wires associated with the target systems 104a, 104z and server systems 122a, 122z, 143a, 143z. Accordingly, the service may then update the port and wire types in the database 137, while the information propagates to the target systems 104a, 104z and server systems 122a, 122z, 143a, 143z.

Figure 4:
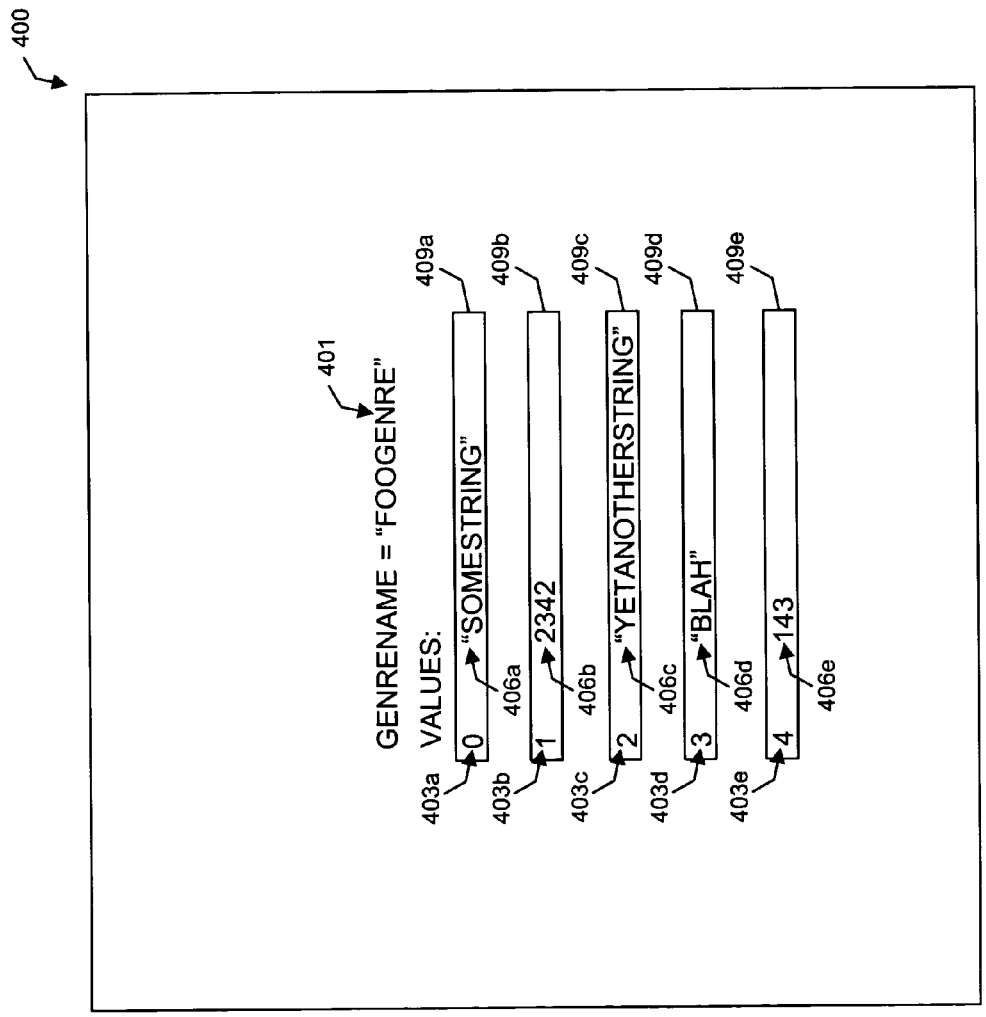
FIG. 4 displays an example genre structure in accordance with an exemplary embodiment of the present invention.

FIG. 4 displays an example genre structure 400 in accordance with an exemplary embodiment of the present invention. In addition to storing ports and wires, the shared memory 113a, 113z stores and provides genre and record information for services 119a, 119b, 140a, 140z. In the exemplary embodiment of the present invention, genres represent runtime settings for services 119a, 119b, 140a, 140z and are not associated with connection ports, wires, or protocols. Accordingly, genres do not have states, protocols, or types. For example, and not limitation, a genre structure 400 may contain configuration data representing a unique identifier that allows a service 119a, 119b, 140a, 140z to determine whether the service is properly registered. Genre structures 400 include, but are not limited to, genre name and records. The genre name 401 is a string that labels and distinguishes genre structures 400. In the exemplary embodiment of the present invention, genre names have a character limit, such as thirty-one characters. The character limit ensures that a fixed sized record can be used to represent the genre name and, thus, assists in increasing lookup speeds. The genre records 409a–409e are indexed within the genre structure 400 by integer value ids 403a–403e and include record values 406a–406e. Generally, integer value ids 403a–403e are only unique within the particular genre structure 400. Unlike ports 304a–304g and wires 316a–316f, record values 406a–406e may contain integer and/or string values. Additionally, genre structures 400 and ports 304a–304g are stored in separate memory spaces within shared memory 113a, 113z.

Figure 5:
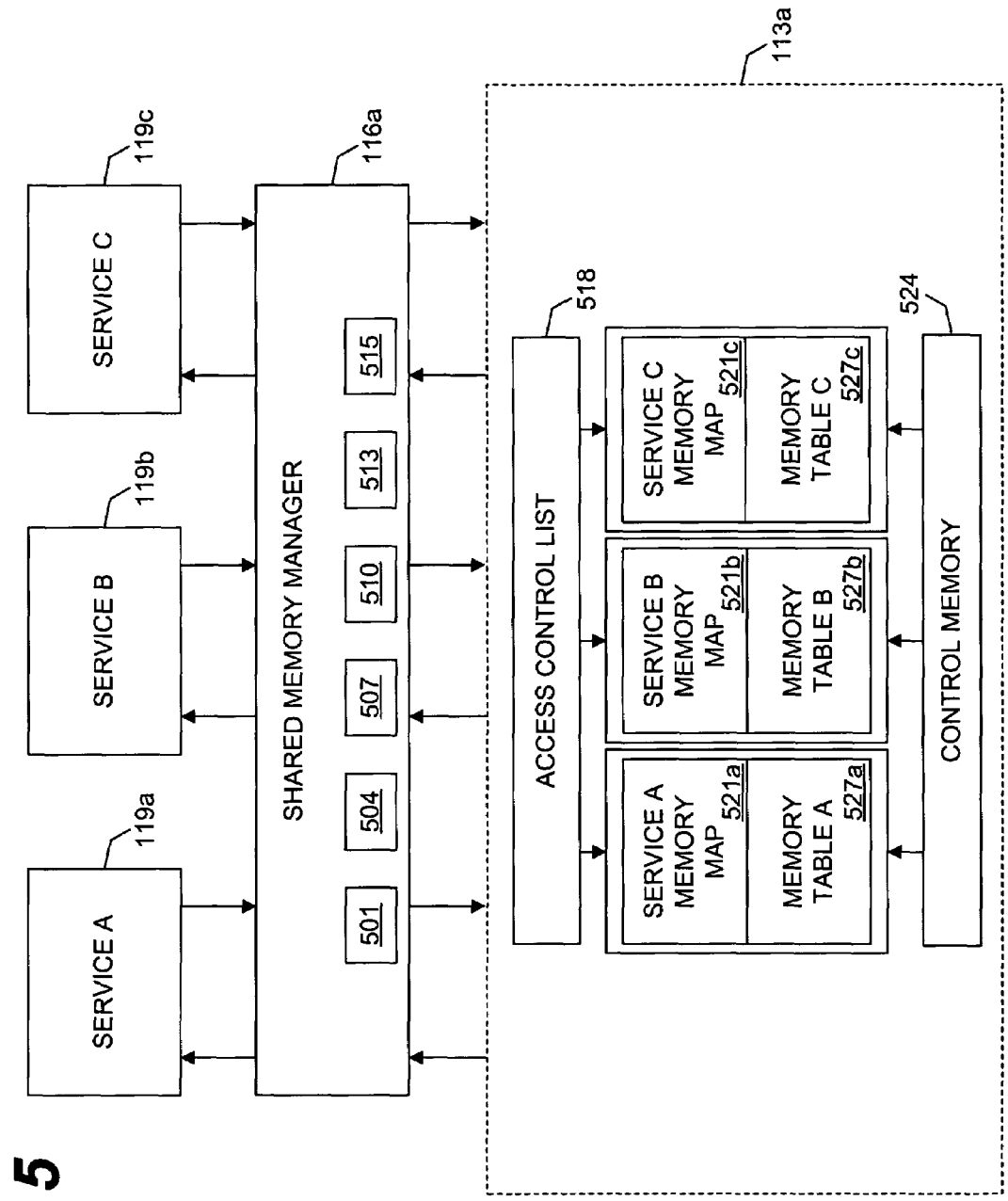
FIG. 5 displays a block diagram representation illustrating a system for accessing configuration data in shared memory in accordance with an exemplary embodiment of the present invention.

FIG. 5 displays a block diagram representation illustrating a system for accessing configuration data in shared memory in accordance with an exemplary embodiment of the present invention. As described above with regard to FIG. 1, services 119a, 119b, 119c connect communicatively with the shared memory manager 116a within a target system 104a. In the exemplary embodiment of the present invention, the shared memory manager 116a provides a plurality of read-only application programming interfaces (APIs) 501, 504, 507, 510, 513, 515 for the services 119a, 119b, 119c to access shared memory 113a. The APIs 501, 504, 507, 510, 513, 515 are generally housed in a dynamic link library (DLL) as part of the shared memory manager 116a. The APIs 501, 504, 507, 510, 513, 515 include, but are not limited to, getporthandle 501, getport 504, getwire 507, getgenrehandle 510, getgenre 513, and getrecord 515. In the exemplary embodiment of the present invention, the APIs are only accessible to services running on the local target system 104a. The APIs 501, 504, 507, 510, 513, 515 are more fully described below with regard to FIGS. 11–16.

In the exemplary embodiment of the present invention, the shared memory 113a includes, but is not limited to, an access control list 518, service memory maps 521a–521c, control memory 524, and memory tables 527a–527c. The access control list 518 includes, but is not limited to, service identifier information which verifies whether the service 119a, 119b, 119c requesting information has permission to receive the requested data. For each service 119a, 119b, 119c with access to the shared memory 113a, there exists a service memory map 521a, 521b, 521c. The service memory maps 521a, 521b, 521c include, but are not limited to, a list of memory tables 527a, 527b, 527c accessible to the requesting service 119a, 119b, 119c. The control memory 524 includes, but is not limited, the physical location in memory that the memory tables 527a, 527b, 527c reside. The memory tables 527a, 527b, 527c include, but are not limited to, configuration data, ports, wires, genres, and records. The access control list 518 is connected communicatively with the service memory maps 521a, 521b, 521c. The service memory maps 521a, 521b, 521c include the memory tables 527a, 527b, 527c in a contiguous memory space. Additionally, the control memory 524 is connected communicatively with the service memory maps 521a, 521b, 521c and memory tables 527a, 527b, 527c and is only used when the memory section is marked "dirty" and a service needs to find its updated memory section. In the exemplary embodiment of the present invention the memory tables 527a, 527b, 527c are broken into sections, where each section can be controlled by the access control list 518 separately.

For example, and not limitation, service "A" 119a may request port information for the printer 296. Using the getport API 504 available through the shared memory manager 116a via the DLL, service "A" 119a sends a request to the shared memory 113a. Generally, the shared memory manager 116a ensures that the access control list 518 is associated with the correct memory sections. The operating system associated with the shared memory manager 116a checks the identifier for service "A" 119a and compares the identifier with a list of identifiers within the access control list 518. Once a match has been determined, the operating system via the access control list 518 permits access to the shared memory manager 116a which creates or accesses the service "A" memory map 521a. If service "A" memory map 521a does not list access to the requested port information, the shared memory manager 116a refuses connection and returns a permission denied message. Otherwise, service "A" memory map 521a accesses the appropriate memory table "C" 527c for the requested port information. Finally, the shared memory 113a returns the requested information retrieved from memory table "C" 527c. If the memory section has been marked "dirty", then a request from service "A" 119a will access the control memory 524 which provides the location of the newly updated memory section.

Figure 6:
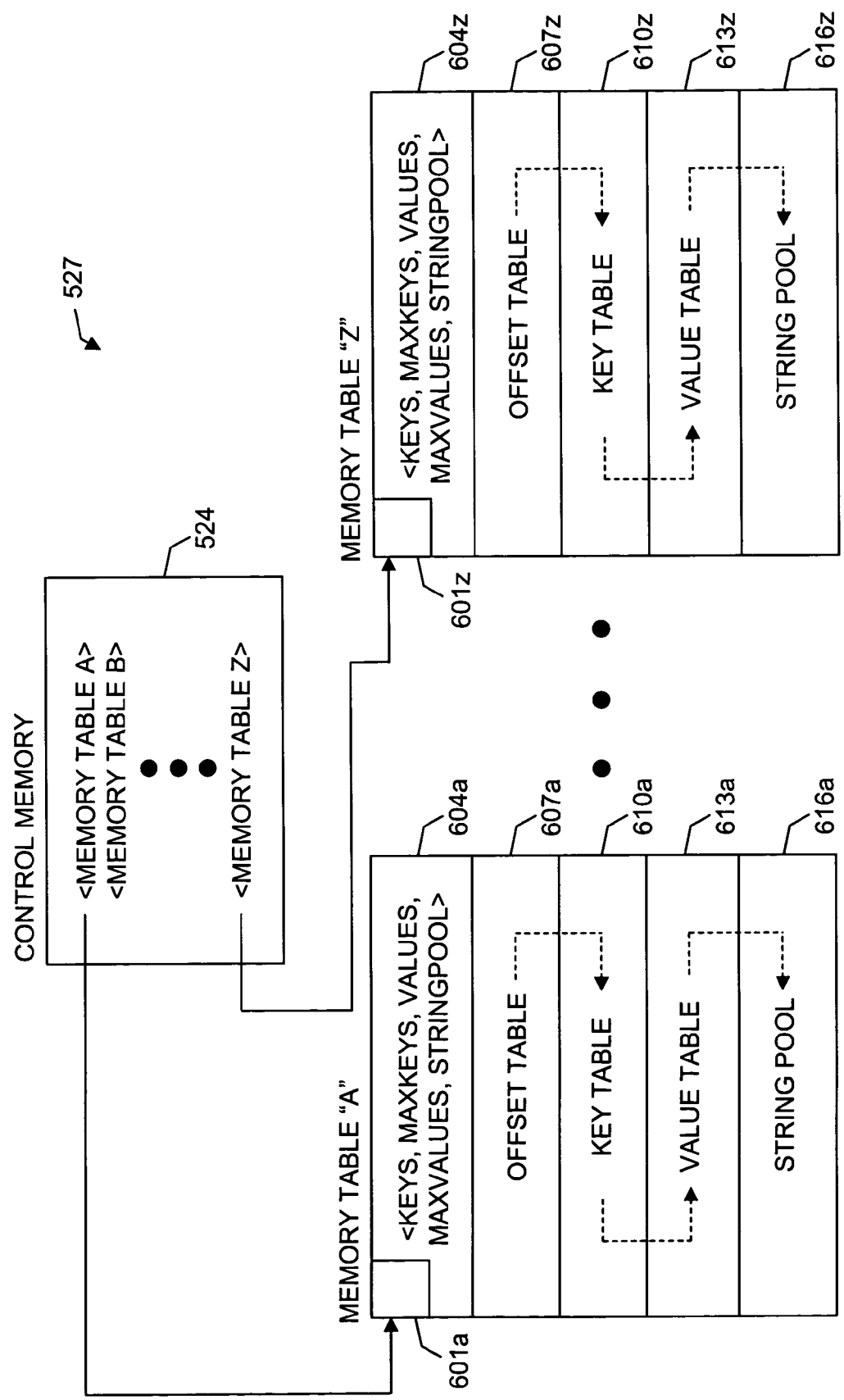
FIG. 6 displays a block diagram representation illustrating memory tables present in shared memory in accordance with an exemplary embodiment of the present invention.

FIG. 6 displays a block diagram representation illustrating memory tables 527 present in shared memory in accordance with an exemplary embodiment of the present invention. As discussed above, memory tables 527 provide appropriate data to services requesting such data. Memory table data includes, but is not limited to, port name, appropriate protocol, state, port type, revision number, wire id, wire value, wire state, genre name, integer value id, and record value. The control memory 524 lists all of the memory tables 527 available in a certain memory allocation. The memory table 527 comprises an invalid bit 601a, 601z, memory table control memory 604a, 604z, offset table 607a, 607z, key table 610a, 610z, value table 613a, 613z, and string pool 616a, 616z. The invalid bit 601a, 601z is used by the shared memory manager 116a, 116z, to mark old memory locations as invalid when new memory has been allocated and the original data has been moved to the new memory location. If the invalid bit 601a, 601z comprises any value other than zero, then the memory location is considered old and invalid. When a service 119a, 119z, 140a, 140z accesses a memory table 527, the service 119a, 119z, 140a, 140z checks the invalid bit 601a, 601z to determine whether the data is still valid. If the invalid bit 601a, 601z indicates that the memory location is old, the service 119a, 119z, 140a, 140z can request the new memory location from the shared memory manager 116a, 116z. The memory table control memory 604a, 604z, provides general information concerning the memory table 527. The ellipsis between memory table "A" 527a and memory table "Z" 527z illustrates that a plurality of memory tables may exist in the shared memory 113a, 113z and, therefore, the shared memory 113a, 113z is not limited to two memory tables as shown in FIG. 6.

The memory table control memory 604a, 604z comprises multiple data elements including, but not limited to, keys, maxkeys, values, maxvalues, stringpool, and revision number. The offset table 607a, 607z provides offset data for relative memory addressing. Generally, the offset data provides a number that determines the starting point in memory of a particular element. Preferably, the offset table 607a, 607z assists in determining the appropriate starting address of certain keys in the key table 610z, 610z. The key table 610z, 610z comprises keys used as identifiers for a value or group of values. The keys are associated with particular values present in the value table 613a, 613z. The value table 613a, 613z comprises data type values or pointers to appropriate strings in the string pool 616a, 616z. Generally, pointers comprise the memory location of certain data instead of the actual data. The string pool 616a, 616z comprises a contiguous sequence of strings (such as alphanumeric characters) with a pointer to the beginning of the string pool 616a, 616z and a pointer at the end of the string pool 616a, 616z. The accessing of data in the memory table 527 is described below with regard to FIG. 10.

Figure 7:
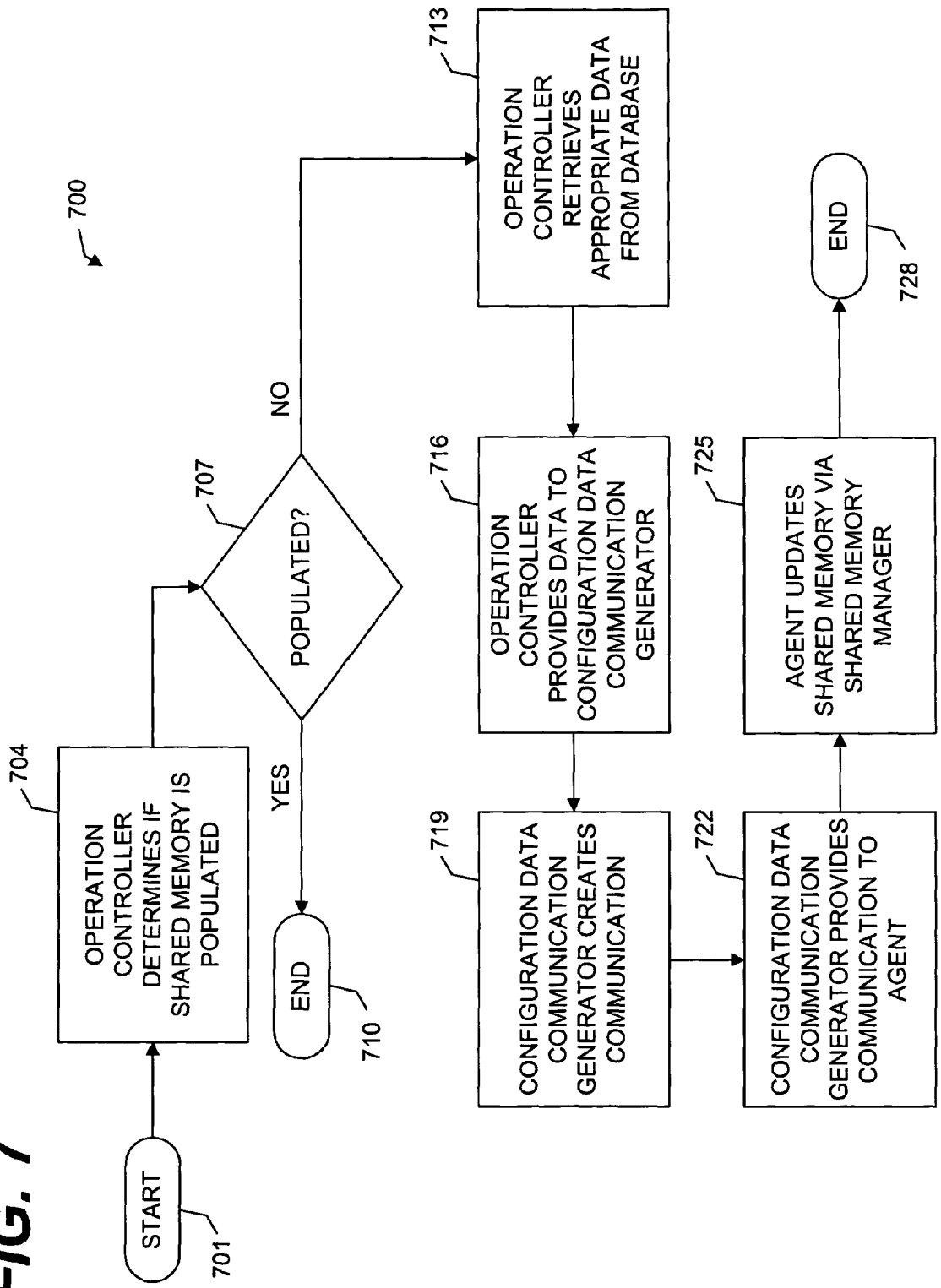
FIG. 7 displays a flowchart representation of a method of initializing shared memory in accordance with an exemplary embodiment of the present invention.

FIG. 7 displays a flowchart representation of a method of initializing shared memory 700 in accordance with an exemplary embodiment of the present invention. During initialization of a target system 104a, 104z the shared memory 113a, 113z must be populated with appropriate data for the services 119a, 119z, 140a, 140z residing on the target system 104a, 104z. Such a population of data would be necessary after a reboot of a target system 104a, 104z. In the exemplary embodiment of the present invention, the operation controller 146 systematically checks target systems 104a, 104z for empty shared memory 113a, 113z.

After starting at step 701, the method proceeds to step 704 where the operation controller 146 determines if the shared memory 113a, 113z of each target system 104a, 104z is populated with data. At step 707 the operation controller 146 verifies whether the particular shared memory 113a, 113z is populated. If so, the method ends at step 710 for the currently accessed shared memory 113a, 113z. The operation controller 146 then repeats the method of initializing shared memory 700 for the shared memory 113a, 113z of the next target system 104a, 104z. If the operation controller 146 determines at step 707 that the shared memory 113a, 113z is not populated, the method continues to step 713. At step 713, the operation controller 146 retrieves all appropriate data for the services 119a, 119z, 140a, 140z residing on the current target system 104a, 104z from the database 137. Next, at step 716, the operation controller 146 provides the retrieved data to the configuration data communication generator 128. Then, at step 719, the configuration data communication generator 128 converts the data into an appropriate communication for transfer to the target system 104a, 104z. Preferably, the configuration data communication generator 128 converts the data into appropriate XML code. Next, at step 722, the configuration data communication generator 128 provides the communication to the configuration data interface agent 110a, 110z. The communication is sent by the configuration data communication generator 128 to the configuration data interface agent 110a, 110z via a secure communication link protected by a firewall 125a, 125b. A secure communication link can be established by encrypting any communication through the secure communication link using secure sockets layer (SSL). Using the communication provided by the configuration data communication generator 128, the configuration data interface agent 110a, 110z, at step 725, interprets the communication and updates the shared memory 113a, 113z via the shared memory manager 116a, 116z. The configuration data interface agent 110a, 110z provides the received data to the shared memory manager 116a, 116z which then updates the shared memory 113a, 113z, accordingly. Once the shared memory 113a, 113z has been initialized with data from the database 137, the method ends at step 728. The shared memory initialization method 700 may then be repeated until all of the target systems 104a, 104z have populated shared memory 113a, 113z.

Figure 8:
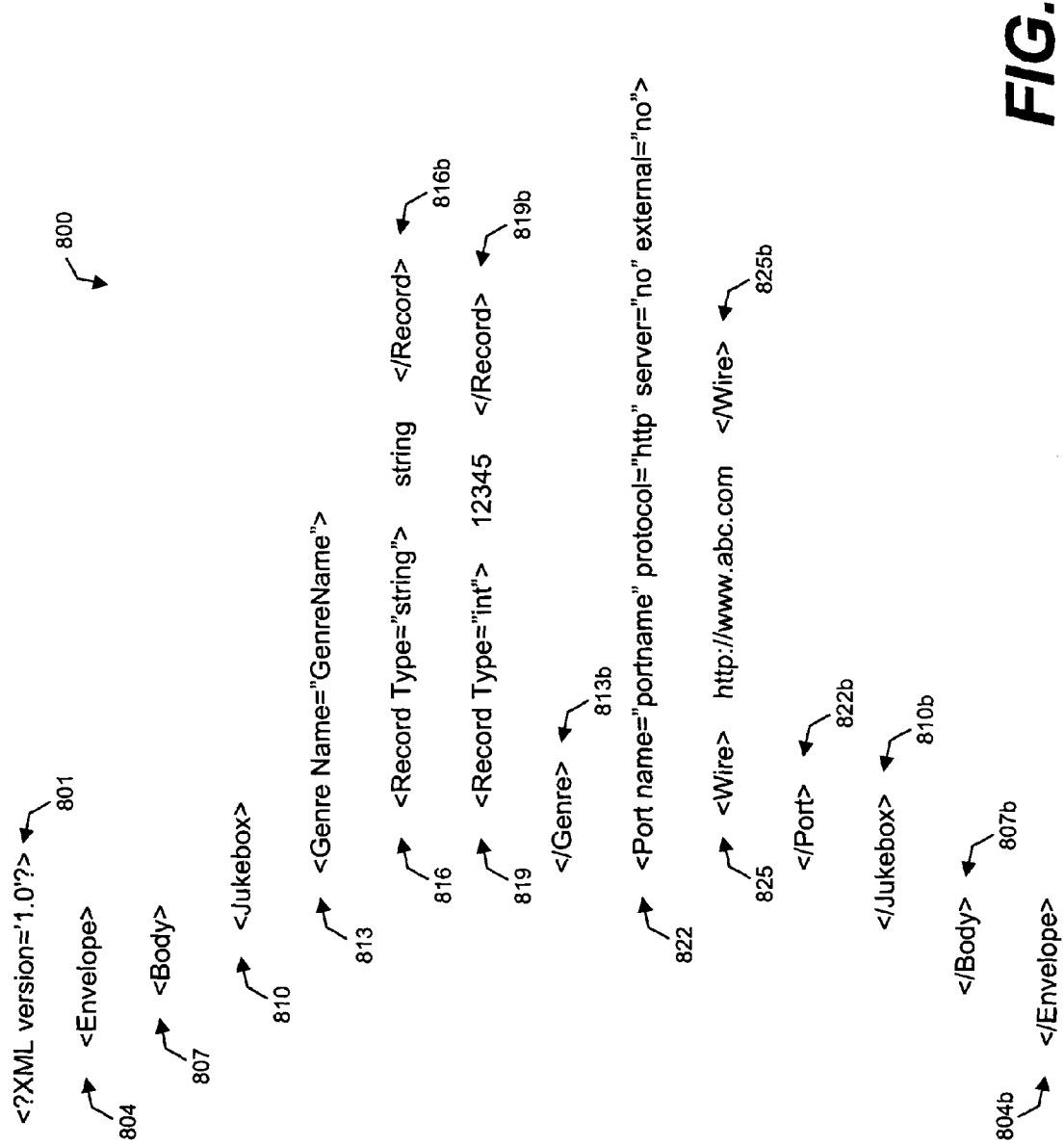
FIG. 8 displays a pseudo-code representation for writing or updating configuration data in shared memory in accordance with an exemplary embodiment of the present invention.

FIG. 8 displays a pseudo-code representation 800 for writing or updating configuration data in shared memory in accordance with an exemplary embodiment of the present invention. As discussed above, the configuration data communication generator 128 generates a communication containing data from the database 137 to send to the configuration data interface agent 110a, 110z via a secured connection. In the exemplary embodiment of the present invention, the communication generated by the configuration data communication generator 128 is XML code. XML provides customizable tags that permit the definition, validation, transmission, and interpretation of data between a plurality of systems. Generally, tags 801–825, 804b–825b are commands used within a document or code that indicates how the portion of a document or code should be formatted or interpreted. One skilled in the art will recognize that XML is derived from standard generalized markup language (SGML) and provides a widely-accepted code format for communication between systems.

The XML tag 801 indicates the beginning of XML code. Generally, tags 801–825 are paired and include a beginning tag and an ending tag. The beginning tag is often represented by a tag name between a less than ("<") and greater than (">") symbol. The ending tag is usually identical to the beginning tag except that after the less than symbol ("<") there is a forward slash ("/"). For example, and not limitation, the beginning envelope tag 804 is represented in FIG. 8 as "<Envelope>". The corresponding ending envelope tag 804b is represented in FIG. 8 as "</Envelope>". Everything in between the beginning envelope tag 804 and the ending envelope tag 804b is interpreted as part of the envelope element. Likewise, all characters between the beginning body tag 807 and the ending body tag 807b represent the body of the envelope. The jukebox tags 810, 810b indicate that the information between the beginning jukebox tag 810 and the ending jukebox tag 810b is data to be used to update shared memory 113a, 113z. Accordingly, the genre tags 813, 813b provide genre data, the record tags 816, 819, 816b, 819b provide record data in string and integer formats, the port tags 822, 822b provide port data, and the wire tags 825, 825b provide wire data. The configuration data interface agent 110a, 110z parses the XML code sent by the configuration data communication generator 128 to extract genre, record, port, and wire data to update the shared memory 113a, 113z via the shared memory manager 116a, 116z.

Figure 9A:
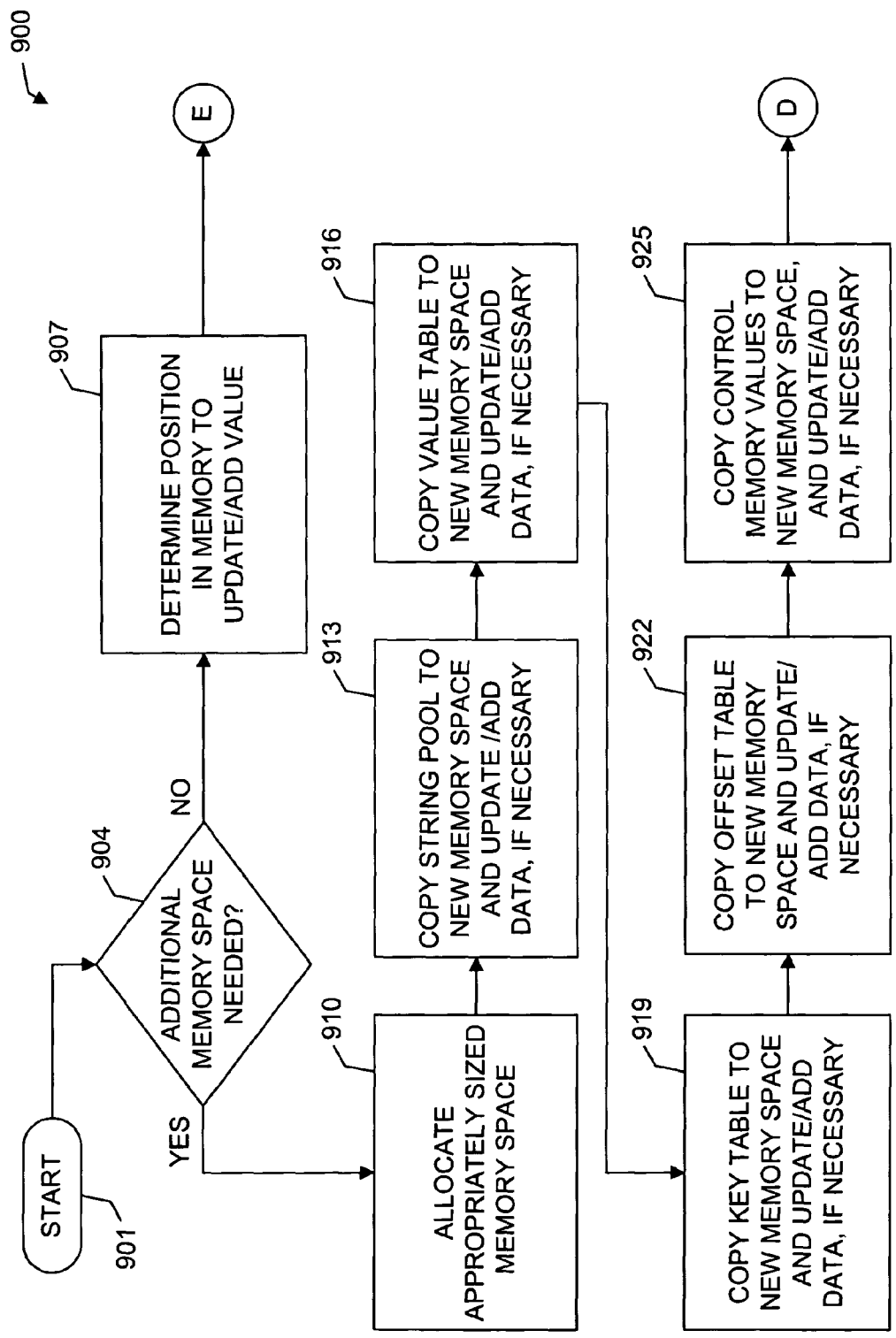
FIGS. 9A–9B display a flowchart representation of a method of updating or adding configuration data in shared memory in accordance with an exemplary embodiment of the present invention.
Figure 9B:
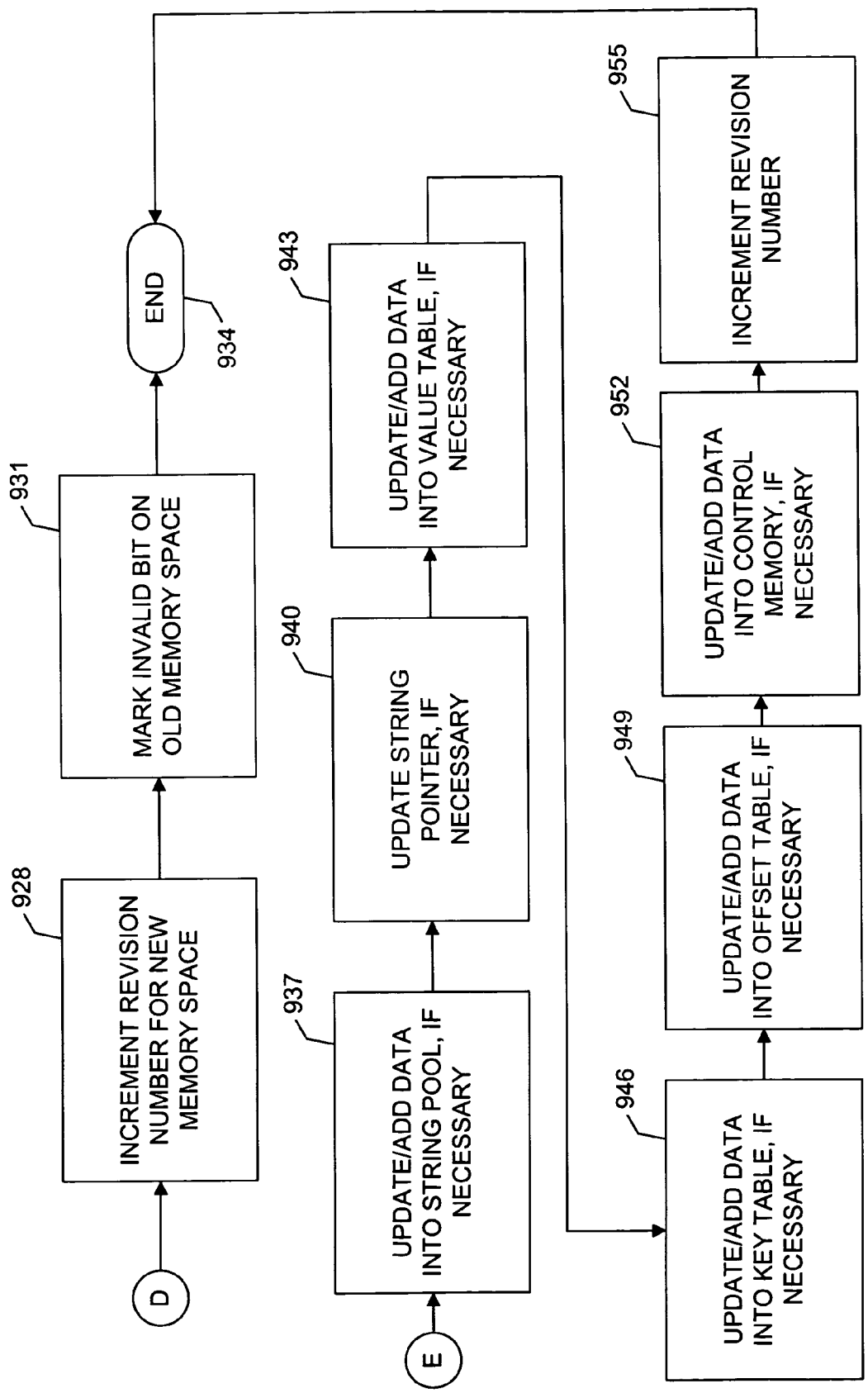

FIGS. 9A–9B display a flowchart representation of a method of updating or adding configuration data in shared memory 900 in accordance with an exemplary embodiment of the present invention. As discussed above, when the configuration data interface agent 110a, 110z receives a communication to update or add data to the shared memory 113a, 113z from the configuration communication generator 128, the configuration data interface agent 110a, 110z provides the shared memory manager 116a, 116z with data to be added or updated in shared memory 113a, 113z. To make such an update or addition, the shared memory manager 116a, 116z must determine if the current memory space is large enough to include the new additions and updates.

After starting at step 901, the shared memory manager 116a, 116z, at step 904, checks the current memory allocation for the shared memory 113a, 113z and determines whether additional memory space is needed. If so, at step 910, the shared memory manager 116a, 116z allocates the appropriately-sized memory space in shared memory 113a, 113z. In the exemplary embodiment of the present invention, the shared memory manager 116a, 116z creates a log entry when additional memory is allocated (not shown). The shared memory manager 116a, 116z copies all of the memory tables 527 from the old memory space to the new memory space in a "bottom-up" approach. The "bottom-up" approach entails copying the lowest level of the memory table 527 first before moving on to the higher levels. This approach assists in memory management by allowing updates and additions without having to lock the original memory table 527. Therefore, services 119a, 119z, 140a, 140z will not be waiting for updates during runtime. Next, at step 913, the shared memory manager 116a, 116z copies data from the string pool 616a, 616z in the old memory space to the newly allocated memory space, if necessary. Additionally, at step 913, the shared memory manager 116a, 116z may add or update the string pool 616a, 616z with new data received from the configuration data interface agent 110a, 110z. Then, at step 916, the shared memory manager 116a, 116z copies data from the value table 613a, 613z in the old memory space to the newly allocated memory space, if necessary. Also, at step 916, the shared memory manager 116a, 116z may add or update the value table 613a, 613z with new data received from the configuration data interface agent 110a, 110z or may add or update pointers to the string pool 616a, 616z. Next, at step 919, the shared memory manager 116a, 116z copies data from the key table 610a, 610z in the old memory space to the newly allocated memory space, if necessary. Additionally, at step 919, the shared memory manager 116a, 116z may add or update the key table 610a, 610z with new data received from the configuration data interface agent 110a, 110z. Then, at step 922, the shared memory manager 116a, 116z copies data from the offset table 607a, 607z in the old memory space to the newly allocated memory space, if necessary. Also, at step 922, the shared memory manager 116a, 116z may add or update the offset table 607a, 607z with new data received from the configuration data interface agent 110a, 110z. Next, at step 925, the shared memory manager 116a, 116z copies data from the memory table control memory 604a, 604z in the old memory space to the newly allocated memory space, if necessary. Additionally, at step 925, the shared memory manager 116a, 116z may add or update the memory table control memory 604a, 604z with new data received from the configuration data interface agent 110a, 110z. At step 928, the revision number for the memory table 527 in the new allocation space is incremented. Incrementing the revision number of a memory table 527, notifies services 119a, 119z, 140a, 140z that use the memory table 527 that a change has occurred and it will be necessary to re-cache the memory table 527 into the service's memory space. Once the memory table 527 has been copied to the newly allocated memory, at step 931, the invalid bit 601a, 601z of the memory table 527 in the old memory space is marked. Marking the invalid bit 601a, 601z in the old memory space notifies services 119a, 119z, 140a, 140z that the data at the old memory location has moved to a new memory allocation. Therefore, the services 119a, 119z, 140a, 140z will need to access the data from the new memory space. Steps 913, 916, 919, 922, 925, 928, 931 may be repeated by the shared memory manager 116a, 116z as necessary to copy all of the memory tables 527 into the new memory allocation. After the shared memory manager 116a, 116z copies all of the appropriate memory tables 527 into the new memory space the method ends at step 934.

If at step 904 additional memory space is not needed, then the method 900 continues to step 907 where the shared memory manager 116a, 116z determines the position in memory to update or add the data. As noted above, the shared memory manager 116a, 116z updates and adds data to the memory table 527 in a "bottom-up" approach. At step 937, the shared memory manager 116a, 116z updates or adds data received from the configuration data interface agent 110a, 110z in the string pool 616a, 616z, if necessary. As mentioned above, the string pool 616a, 616z is a collection of strings containing pointers at the beginning and end of the string pool 616a, 616z. Therefore, at step 940, the shared memory manager 116a, 116z may update the string pointers, if necessary, to facilitate an addition to the string pool 616a, 616z. Next, at step 943, the shared memory manager 116a, 116z updates or adds data received from the configuration data interface agent 110a, 110z in the value table 613a, 613b, if necessary. Then, at step 946, the shared memory manager 116a, 116z updates or adds data received from the configuration data interface agent 110a, 110z in the key table 610a, 610z, if necessary. The method 900 then moves to step 949, where the shared memory manager 116a, 116z updates or adds data received from the configuration data interface agent 110a, 110z in the offset table 607a, 607z, if necessary. Next, at step 952, the shared memory manager 116a, 116z updates or adds data received from the configuration data interface agent 110a, 110z in the memory table control memory 604a, 604z, if necessary. Finally, at step 955, the revision number of the memory table 527 is incremented by the shared memory manager 116a, 116z to alert services 119a, 119z, 140a, 140z that the memory table 527 has changed contents. The method 900 ends at step 934. If the shared memory manager 116a, 116z adds a new memory table 527, instead of adding or updating data in a memory table 527, then the shared memory manager 116a, 116z may update the control memory 524 in the memory space to indicate a new memory table 527 has been created (not shown). Using the "bottom-up" approach, the control memory 524 in the memory space would be updated after the new memory table 527 had been created.

Figure 10A:
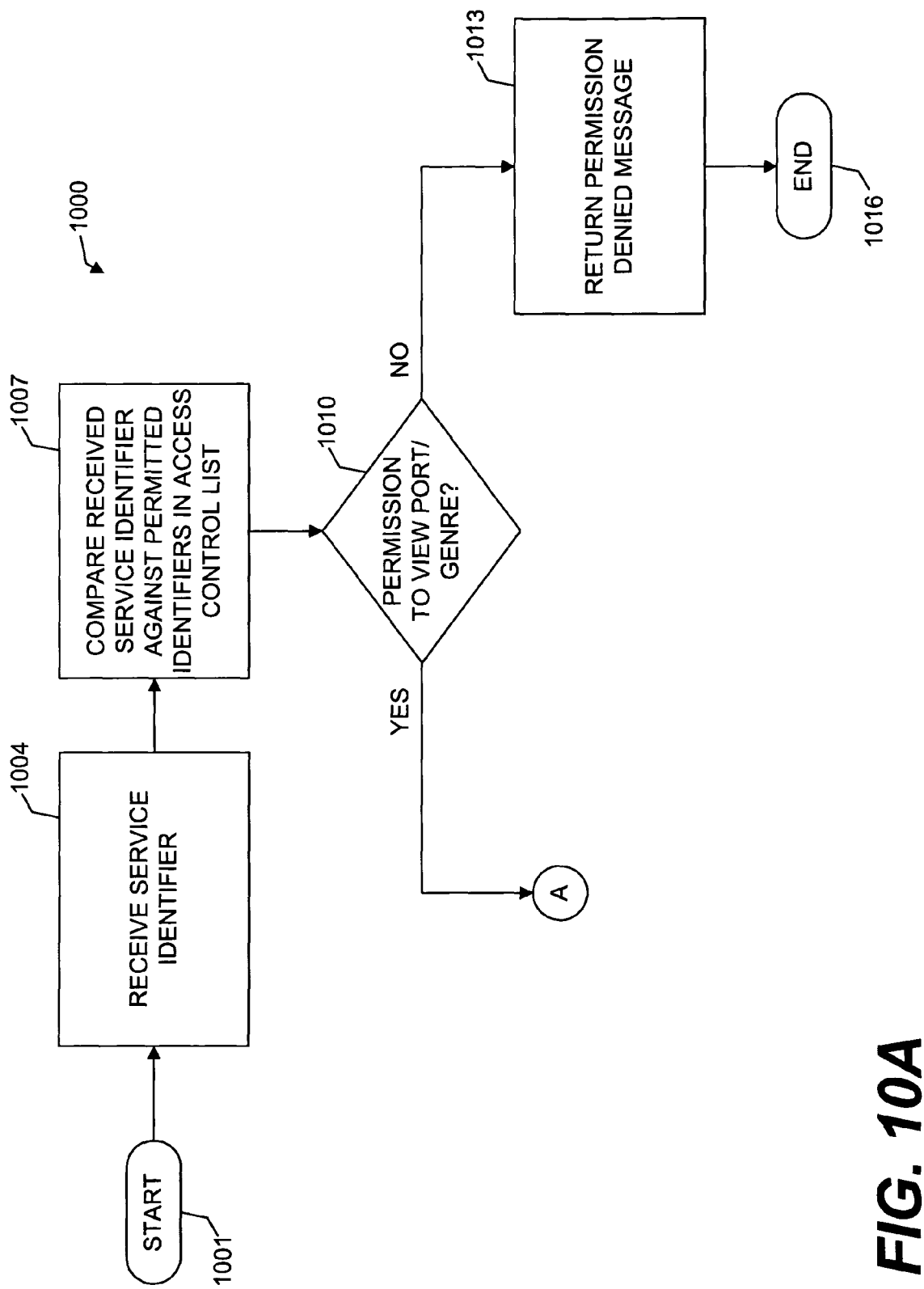
FIGS. 10A–10C display a flowchart representation of a method of accessing data from shared memory in accordance with an exemplary embodiment of the present invention.
Figure 10B:
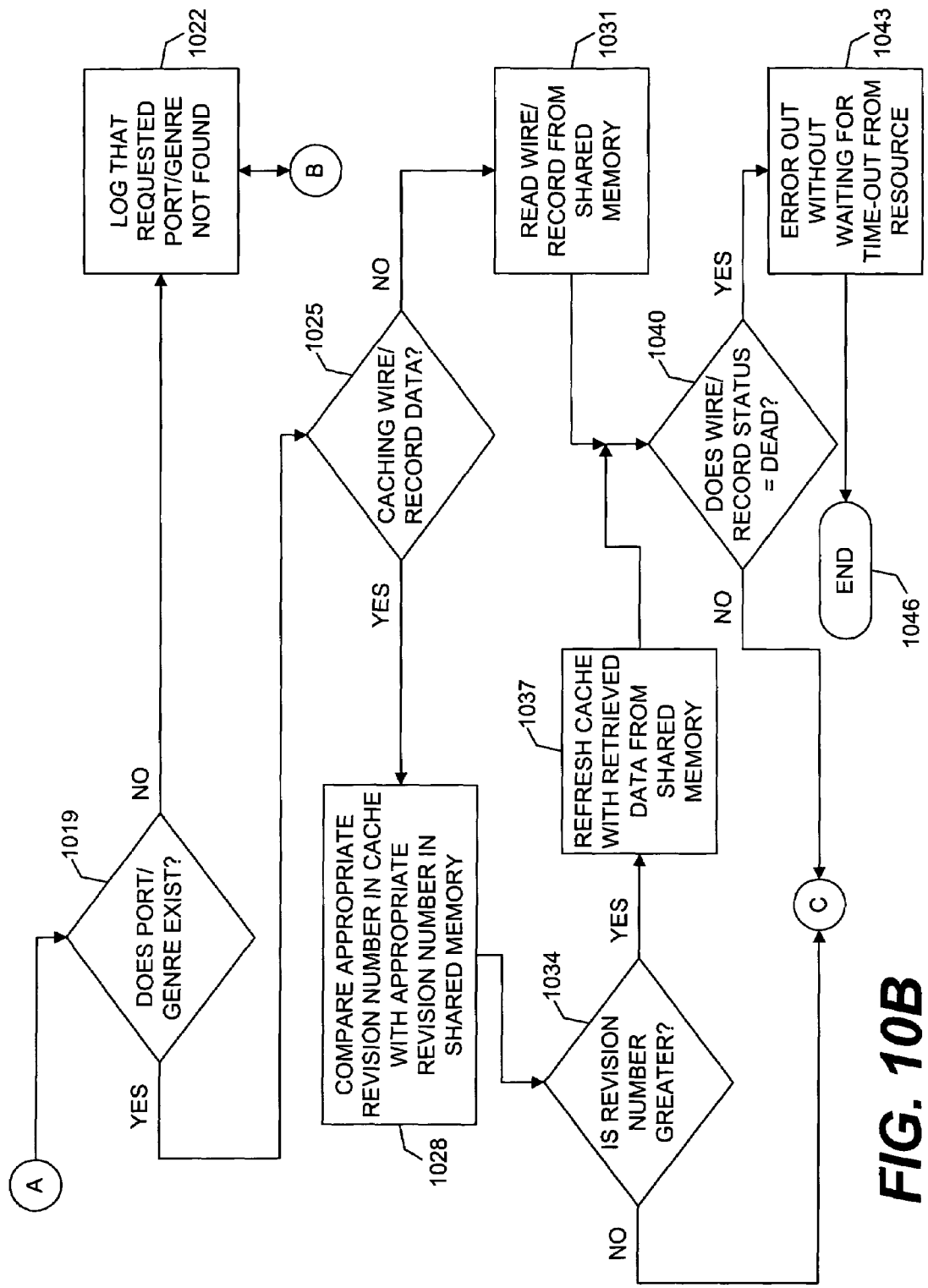
Figure 10C:
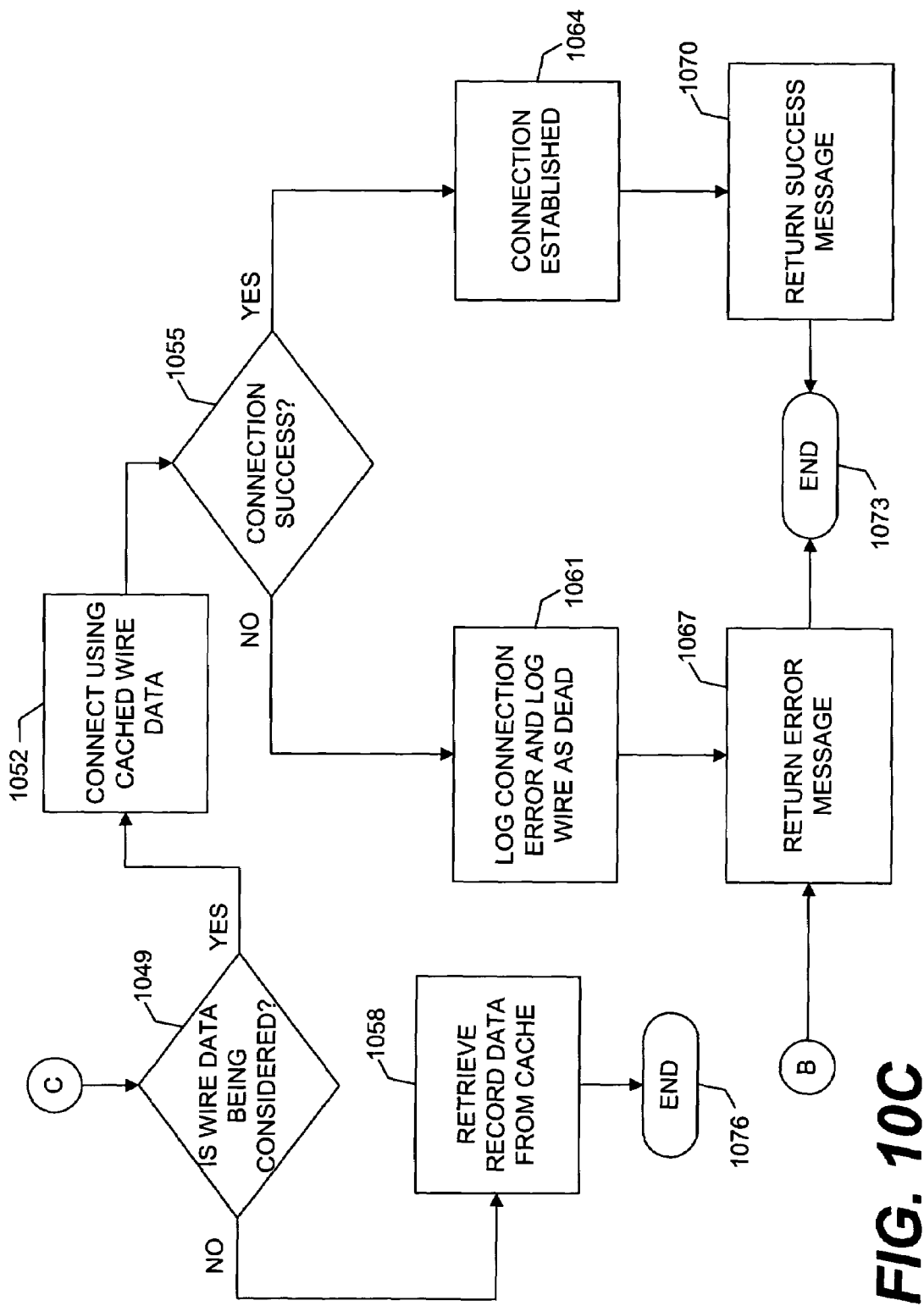
Figure 11:
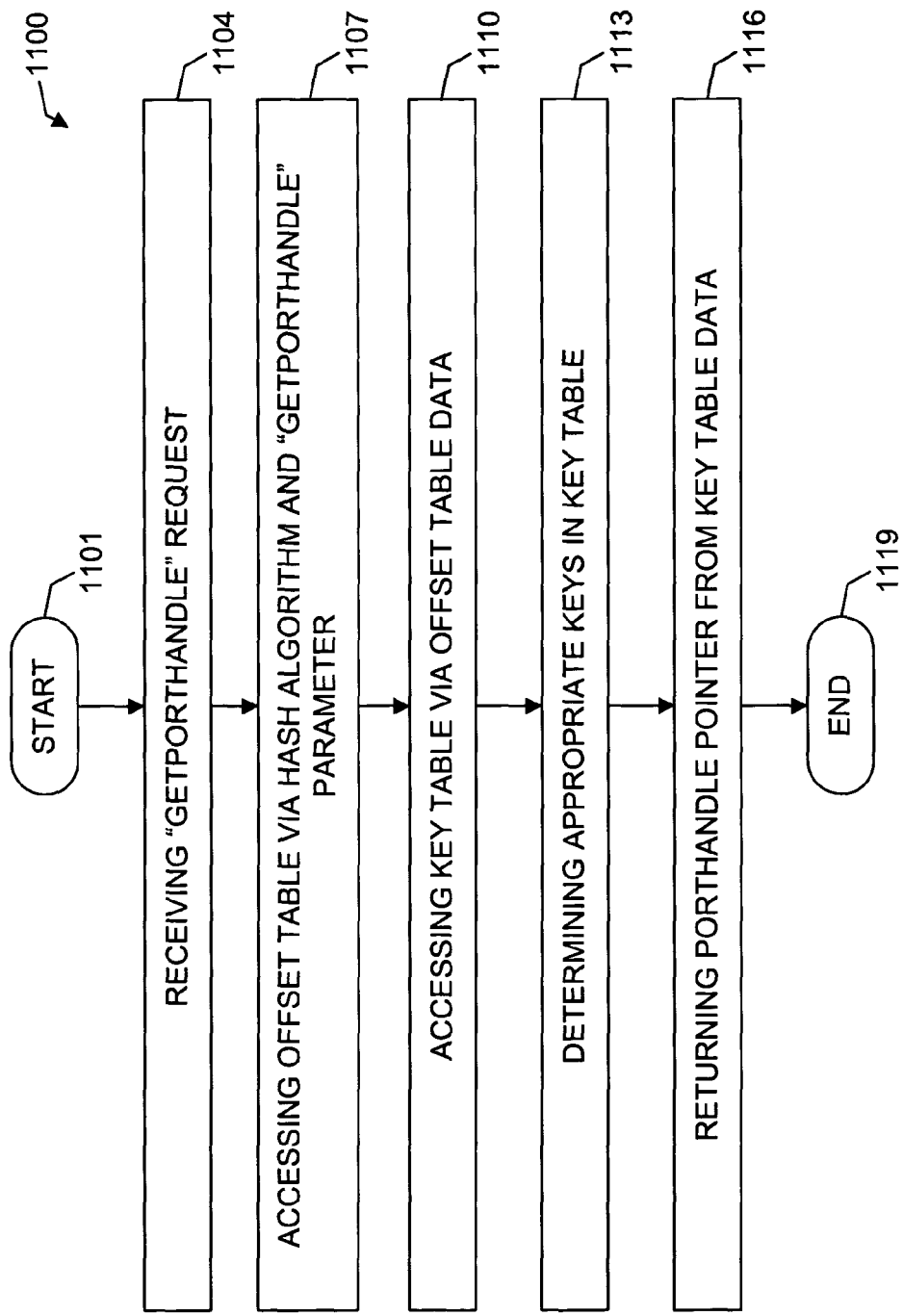
FIG. 11 displays a flowchart representation of a method of accessing port-handle information in accordance with an exemplary embodiment of the present invention.

FIGS. 10A–10C display a flowchart representation of a method of accessing data from shared memory 1000 in accordance with an exemplary embodiment of the present invention. Recall that when accessing the shared memory 113a, 113z, the shared memory manager 116a, 116z via the access control list 518 determines whether the service 119a, 119z, 140a, 140z has permission to access the requested data. After starting the method of accessing data in shared memory 1000, at step 1001, the shared memory manager 116a, 116z, at step 1004, receives a request from a service 119a, 119z, 140a, 140z and the identifier associated with the service 119a, 119z, 140a, 140z. At step 1007, the operating system associated with the shared memory manager 116a, 116z compares the received identifier with the permitted identifiers listed in the access control list 518. Next, at step 1010, the operating system determines if the service 119a, 119z, 140a, 140z has permission to access the requested data. Generally, the operating system determines whether the service 119a, 119z, 140a, 140z has permission to access the port 304a–304g or genre 400 that contains the requested data. If the operating system matches the service identifier in the access control list 518 and the memory table 527 containing the requested data is found in the appropriate service memory map 521a, 521b, 521c, then the service 119a, 119z, 140a, 140z has permission to access the data. Otherwise, the service 119a, 119z, 140a, 140z does not have access to the data and the method 1000 continues to step 1013. At step 1013, the shared memory manager 116a, 116z returns a permission denied message to the service 119a, 119z, 140a, 140z that requested access to the data. Once the permission denied message has been sent, the method 1000 ends at step 1016.

If, however, at step 1010, the operating system determines that the service does have access to the requested data, then the shared memory manager 116a, 116z determines whether the requested port 304a–304g or genre 400 exists, at step 1019. If no memory table 527 exists for the requested port 304a–304g or genre 400, then, at step 1022, the shared memory manager 116a, 116z sends a message to the error log that the requested port 304a–304g or genre 400 was not found. Next, at step 1067, the shared memory manager 116a, 116z returns an error message to the service 119a, 119z, 140a, 140z requesting the data. The method 1000 would then end, at step 1073.

If, at step 1019, the shared memory manager 116a, 116z determines that the port 304a–304g or genre 400 exists, then the method 1000 continues to step 1025. At step 1025, the service 119a, 119z, 140a, 140z determines whether it is caching the wire 316a–316f and record 409a–409e data. The service 119a, 119z, 140a, 140z comprises information including, but not limited to, the request data (such as the port, genre, wire, or record), the service identifier, caching status, and cached revision number. The caching status identifies whether the requesting service 119a, 119z, 140a, 140z is caching wires 316a–316f or records 409a–409e.

If, at step 1025, the service 119a, 119z, 140a, 140z determines that it is not caching the wire 316a–316f and record 409a–409e data, then the service 119a, 119z, 140a, 140z, at step 1031, attempts to read the requested data from shared memory 113a, 113z. The method 1000 then continues to step 1040, discussed below.

Otherwise, if at step 1025 the service 119a, 119z, 140a, 140z determines that it is caching the wire 316a–316f and record 409a–409e data, then the service 119a, 119z, 140a, 140z, at step 1028, compares its cached revision number with the appropriate revision number in shared memory 113a, 113z. As discussed above, the revision number in shared memory 113a, 113z is stored in the port 304a–304g or genre 400 memory table 527. Next, at step 1034, the service 119a, 119z, 140a, 140z determines whether the appropriate revision number read from shared memory 113a, 113z is greater than its cached revision number. If so, at step 1037, the service 119a, 119z attempts to retrieve the requested data from shared memory 113a, 113z and, if successful, the service 119a, 119z, 140a, 140z refreshes its cache. Next, the method 1000 continues to step 1040, discussed below.

If, however, at step 1034, the service 119a, 119z, 140a, 140z determines that the appropriate revision number is not greater than its cached revision number, then the method 1000 continues to step 1049, discussed below.

When the method 1000 reaches step 1040, the service 119a, 119z, 140a, 140z determines whether the requested wire 316a–316f or record 409a–409e is dead. Records 409a–409e do not typically have a status and thus would never be dead. Therefore, if the service 119a, 119z, 140a, 140z was requesting record 409a–409e data, the method 1000 would continue to step 1049. As discussed above, wires 316a–316f contain a wire status that can be read, write, or dead. If the service 119a, 119z, 140a, 140z determines that the wire 316a–316f status is dead, the method 1000 continues to step 1043. At step 1043, the service 119a, 119z, 140a, 140z errors out without waiting for a time-out from the requested resource. The method 1000 then ends at step 1046.

If, however, at step 1040, the service 119a, 119z, 140a, 140z determines that the wire 316a–316f is not dead, the method continues to step 1049.

When the method 1000 reaches step 1049, the service 119a, 119z, 140a, 140z determines whether the requested data is wire data or record data. If the requested data is not wire data, then the service retrieves the record data from the service cache. The method 1000 then ends at step 1076. Otherwise, if, at step 1049, the service 119a, 119z, 140a, 140z determines that the requested data is wire data, then the service 119a, 119b, 140a, 140z connects using the cached wire data, at step 1052.

Next, at step 1055, the service 119a, 119b, 140a, 140z will either make a successful connection or the connection will fail. If the connection fails, the method 1000 continues to step 1061 where the service 119a, 119z, 140a, 140z logs the connection error and logs the wire 316a–316f as dead in the error log. Then, at step 1067, the service 119a, 119z, 140a, 140z returns an error message to the client making the service request. The method 1000 then ends at step 1073. If, however, at step 1055 the connection is successful, then a connection is established, at step 1064, for the service 119a, 119z, 140a, 140z. Then, at step 1070, the service 119a, 119z, 140a, 140z returns a connection success message to the client making the service request. The method 1000 then ends at step 1073.

FIGS. 11–16 display flowchart representation of methods representing the APIs in an exemplary embodiment of the present invention as discussed above with reference to FIG. 5. Specifically, FIG. 11 displays a flowchart representation of a method of accessing port-handle information 1100 in accordance with an exemplary embodiment of the present invention. After starting at step 1101, the method 1100 proceeds to step 1104 where the shared memory manager 116a, 116z receives a getporthandle request from a service 119a, 119z, 140a, 140z. At step 1107, the shared memory manager 116a, 116z accesses the offset table 607a, 607z of the appropriate memory table 257 containing the requested port 304a–304g. Using a hash table, the shared memory manager 116a, 116z can use a getporthandle parameter (such as the port name) to access the appropriate offset table 607a, 607z. Next, at step 1110, the shared memory manager 116a, 116z accesses the appropriate key table 610a, 610z via the offset data. As discussed above, the offset data assists in determining the appropriate starting address of appropriate keys in the key table 610z, 610z. Then, at step 1113, the shared memory manager 116a, 116z determines the appropriate key or keys in the key table 610a, 610z. Typically, the key is used to create a handle so that data can be accessed directly from the memory table 527 without having to access the hash algorithm or offset table 607a, 607z. Next, at step 1116, the shared memory manager 116a, 116z returns the porthandle pointer generated from the key table 610a, 610z to the requesting service 119a, 119z, 140a, 140z. The method 1100 then ends at step 1119.

Figure 12:
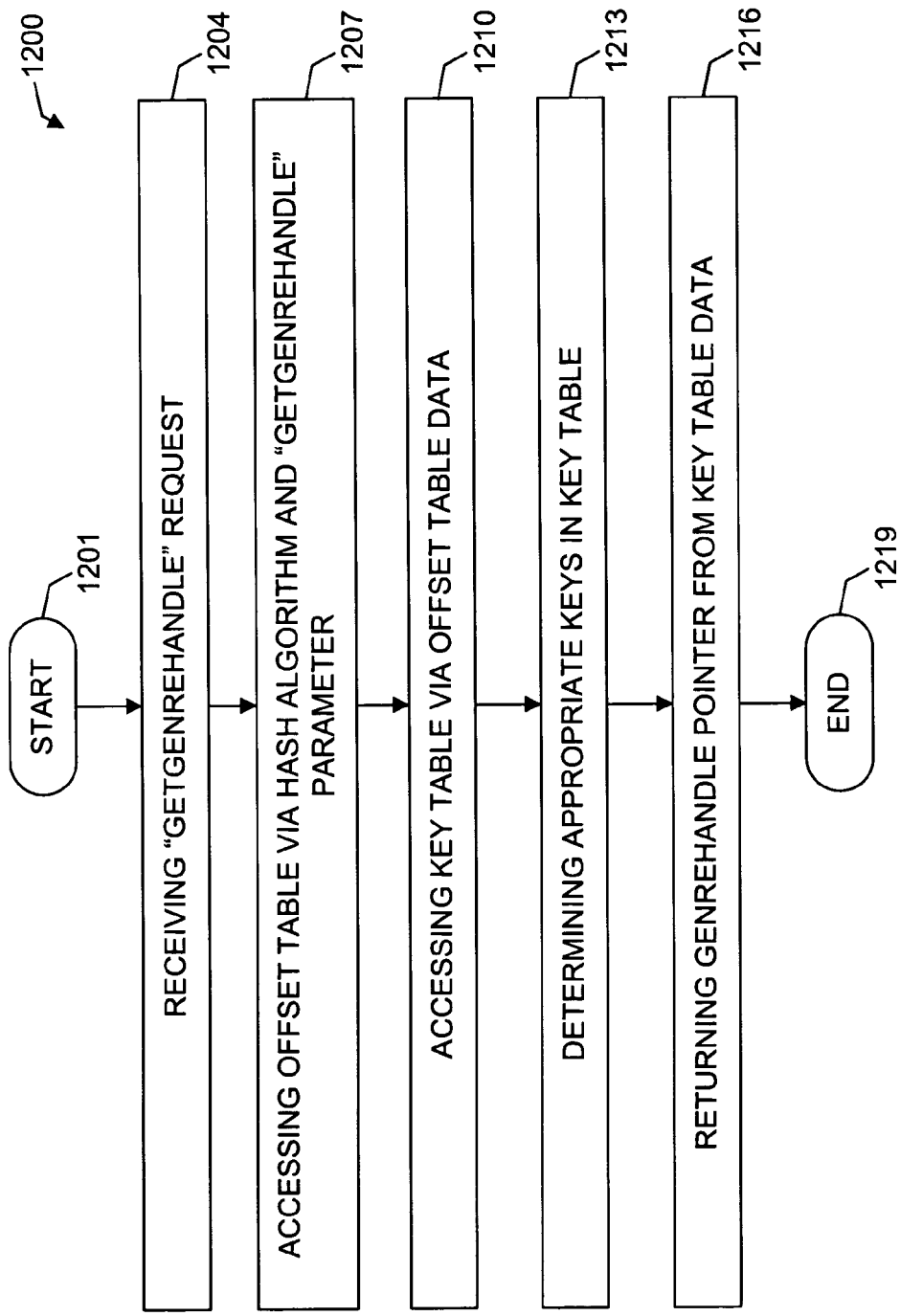
FIG. 12 displays a flowchart representation of a method of accessing genre-handle information in accordance with an exemplary embodiment of the present invention.

FIG. 12 displays a flowchart representation of a method of accessing genre-handle information 1200 in accordance with an exemplary embodiment of the present invention. After starting at step 1201, the method 1200 proceeds to step 1204 where the shared memory manager 116a, 116z receives a getgenrehandle request from a service 119a, 119z, 140a, 140z. At step 1207, the shared memory manager 116a, 116z accesses the offset table 607a, 607z of the appropriate memory table 257 containing the requested genre 400. Using a hash table, the shared memory manager 116a, 116z can use a getgenrehandle parameter (such as the genre name) to access the appropriate offset table 607a, 607z.

Next, at step 1210, the shared memory manager 116a, 116z accesses the appropriate key table 610a, 610z via the offset data. Then, at step 1213, the shared memory manager 116a, 116z determines the appropriate key or keys in the key table 610a, 610z. As discussed above, the key is used to create a handle so that data can be accessed directly from the memory table 527 without having to access the hash algorithm or offset table 607a, 607z. Next, at step 1216, the shared memory manager 116a, 116z returns the genrehandle pointer generated from the key table 610a, 610z to the requesting service 119a, 119z, 140a, 140z. The method 1200 then ends at step 1219.

Figure 13:
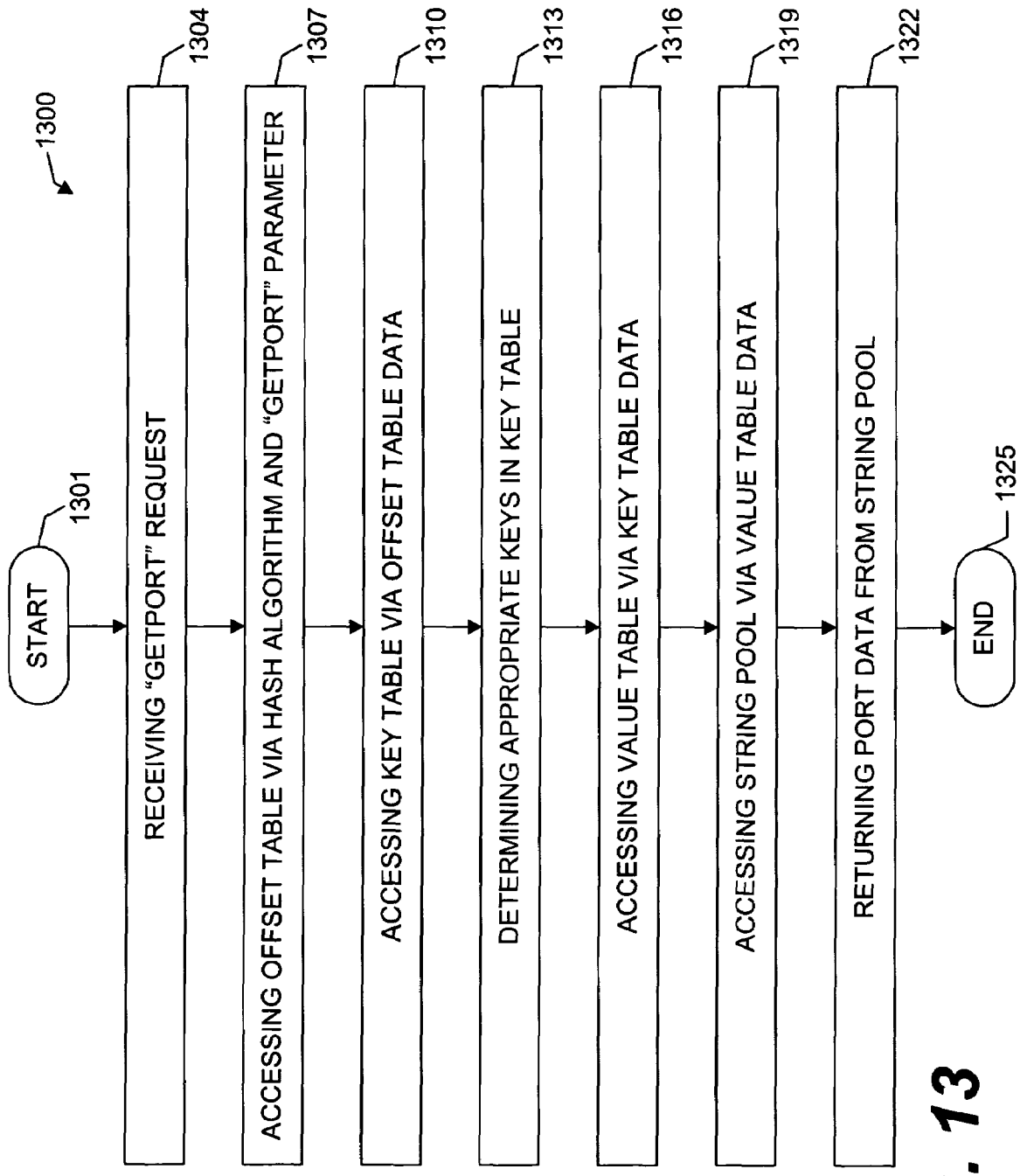
FIG. 13 displays a flowchart representation of a method of accessing port information in accordance with an exemplary embodiment of the present invention.

FIG. 13 displays a flowchart representation of a method of accessing port information 1300 in accordance with an exemplary embodiment of the present invention. After starting at step 1301, the method 1300 proceeds to step 1304 where the shared memory manager 116a, 116z receives a getport request from a service 119a, 119z, 140a, 140z. Next, at step 1307, the shared memory manager 116a, 116z accesses the offset table 607a, 607z by using a hash algorithm. The shared memory manager 116a, 116z may use a getport parameter (such as the port name) to access the appropriate offset table 607a, 607z via the hash algorithm. Then, at step 1310, the shared memory manager 116a, 116z accesses the key table 610a, 610z via the offset data retrieved from the offset table 607a, 607z. The method 1300 then proceeds to step 1313 where the shared memory manager 116a, 116z determines the appropriate keys in the key table 610a, 610z. Next, at step 1316, the shared memory manager 116a, 116z accesses the corresponding values in the value table 613a, 613z based on the keys retrieved in the key table 610a, 610z. If the values in the value table 613a, 613z comprise of pointers that point to the string pool 616a, 616z, then the method 1300 proceeds to step 1319 where the shared memory manager 116a, 116z retrieves the appropriate data from the string pool 616a, 616z via the values retrieved from the value table 613a, 613z. Next, at step 1322, the shared memory manager 116a, 116z returns appropriate port data from the string pool 616a, 616z to the requesting service 119a, 119z, 140a, 140z. The method 1300 then ends at step 1325. In another embodiment of the present invention, if the getport request uses a porthandle, then steps 1307 and 1310 may be omitted.

Figure 14:
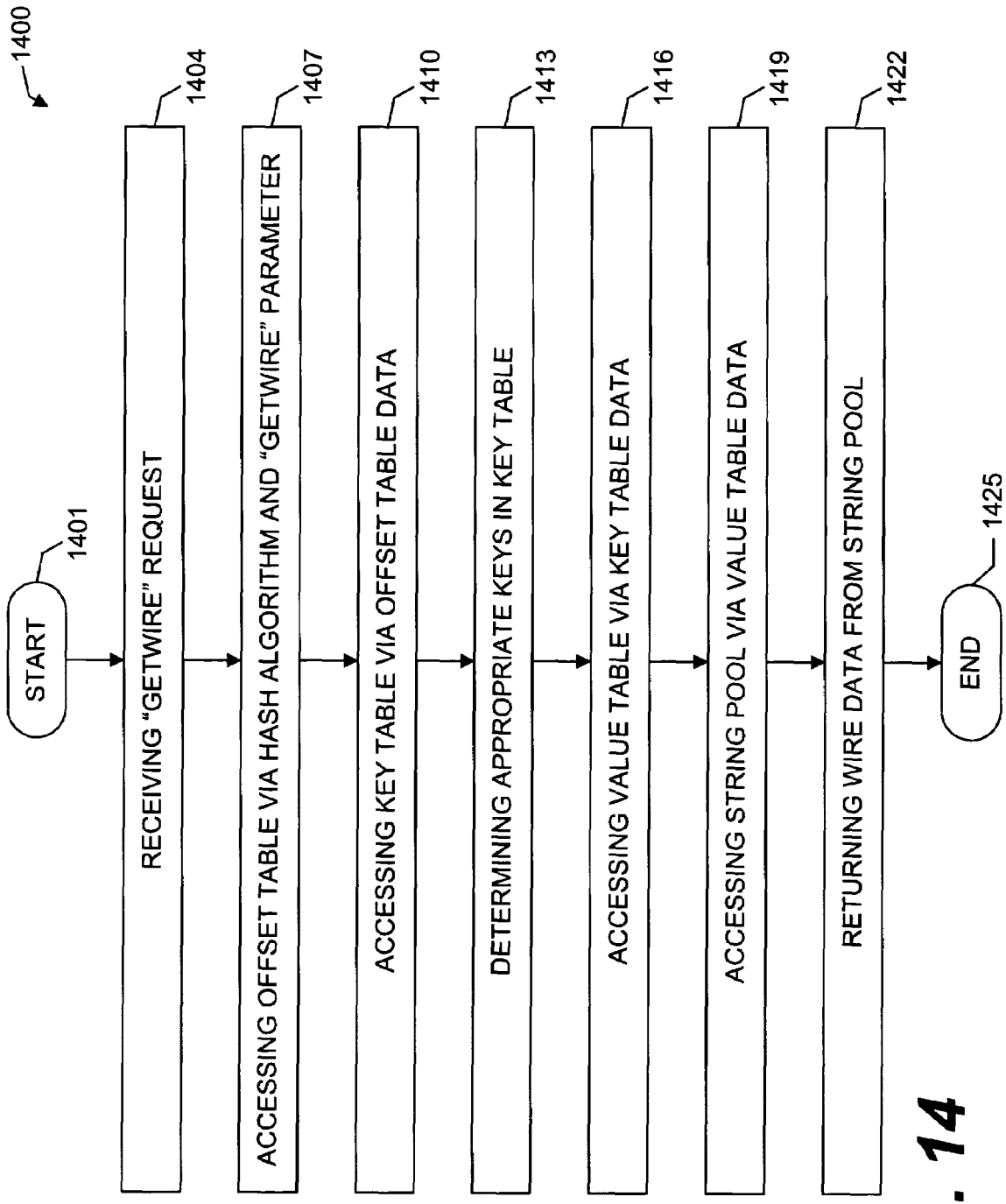
FIG. 14 displays a flowchart representation of a method of accessing wire information in accordance with an exemplary embodiment of the present invention.

FIG. 14 displays a flowchart representation of a method of accessing wire information 1400 in accordance with an exemplary embodiment of the present invention. After starting at step 1401, the method 1400 proceeds to step 1404 where the shared memory manager 116a, 116z receives a getwire request from a service 119a, 119z, 140a, 140z. Next, at step 1407, the shared memory manager 116a, 116z accesses the offset table 607a, 607z by using a hash algorithm. The shared memory manager 116a, 116z may use a getwire parameter (such as the port name) to access the appropriate offset table 607a, 607z via the hash algorithm. Then, at step 1410, the shared memory manager 116a, 116z accesses the key table 610a, 610z via the offset data retrieved from the offset table 607a, 607z. The method 1400 then proceeds to step 1413 where the shared memory manager 116a, 116z determines the appropriate keys in the key table 610a, 610z. Next, at step 1416, the shared memory manager 116a, 116z accesses the corresponding values in the value table 613a, 613z based on the keys retrieved in the key table 610a, 610z. If the values in the value table 613a, 613z comprise of pointers that point to the string pool 616a, 616z, then the method 1400 proceeds to step 1419 where the shared memory manager 116a, 116z retrieves the appropriate data from the string pool 616a, 616z via the values retrieved from the value table 613*a*, 613*z*. Next, at step 1422, the shared memory manager 116*a*, 116*z* returns the appropriate wire data from the string pool 616*a*, 616*z* to the requesting service 119*a*, 119*z*, 140*a*, 140*z*. The method 1400 then ends at step 1425. In another embodiment of the present invention, if the getwire request uses a porthandle, then steps 1407 and 1410 may be omitted.

Figure 15:
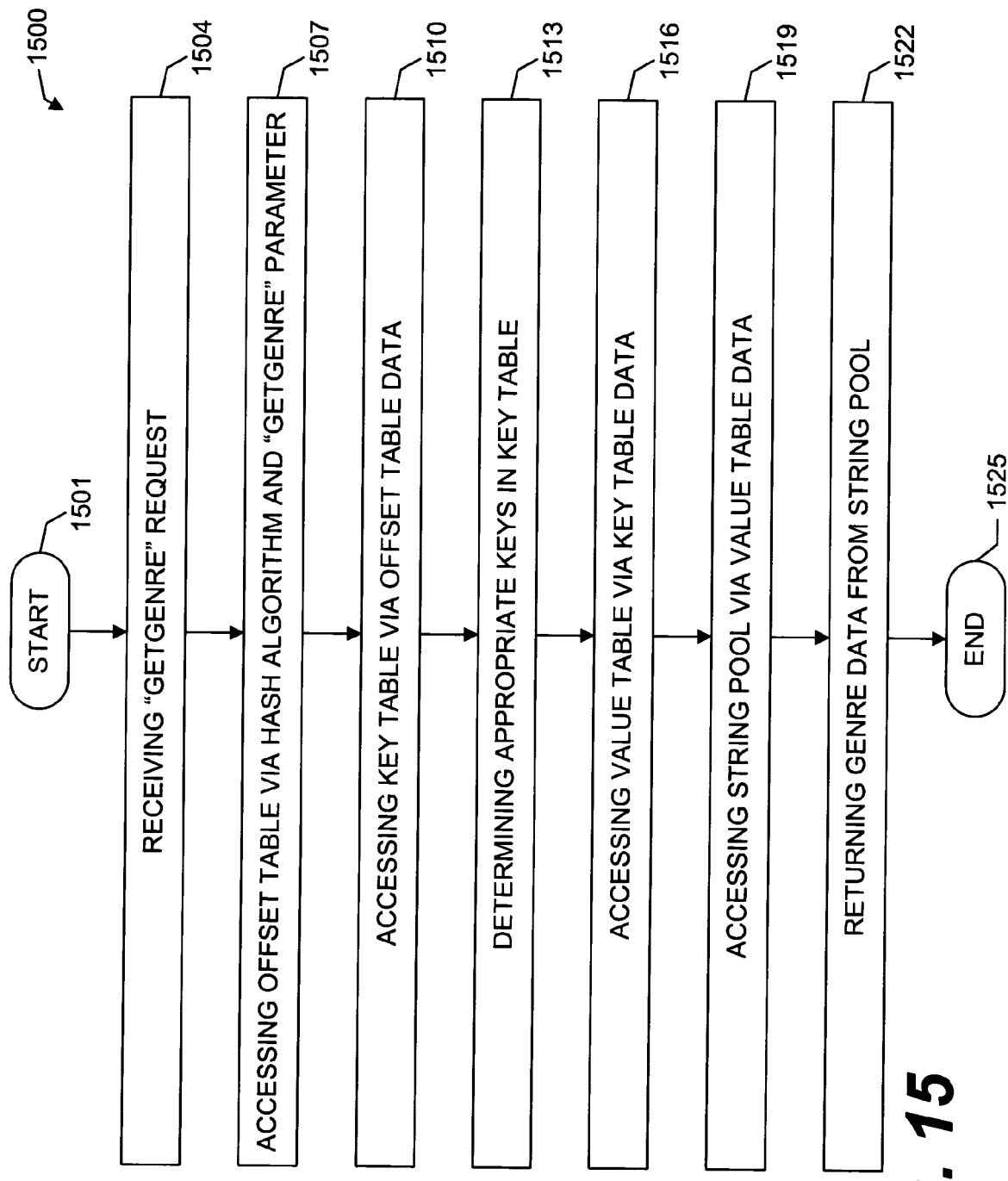
FIG. 15 displays a flowchart representation of a method of accessing genre information in accordance with an exemplary embodiment of the present invention.

FIG. 15 displays a flowchart representation of a method of accessing genre information 1500 in accordance with an exemplary embodiment of the present invention. After starting at step 1501, the method 1500 proceeds to step 1504 where the shared memory manager 116*a*, 116*z* receives a getgenre request from a service 119*a*, 119*z*, 140*a*, 140*z*. Next, at step 1507, the shared memory manager 116*a*, 116*z* accesses the offset table 607*a*, 607*z* by using a hash algorithm. The shared memory manager 116*a*, 116*z* may use a getgenre parameter (such as the genre name) to access the appropriate offset table 607*a*, 607*z* via the hash algorithm. Then, at step 1510, the shared memory manager 116*a*, 116*z* accesses the key table 610*a*, 610*z* via the offset data retrieved from the offset table 607*a*, 607*z*. The method 1500 then proceeds to step 1513 where the shared memory manager 116*a*, 116*z* determines the appropriate keys in the key table 610*a*, 610*z*. Next, at step 1516, the shared memory manager 116*a*, 116*z* accesses the corresponding values in the value table 613*a*, 613*z* based on the keys retrieved in the key table 610*a*, 610*z*. If the values in the value table 613*a*, 613*z* comprise of pointers that point to the string pool 616*a*, 616*z*, then the method 1500 proceeds to step 1519 where the shared memory manager 116*a*, 116*z* retrieves the appropriate data from the string pool 616*a*, 616*z* via the values retrieved from the value table 613*a*, 613*z*. Next, at step 1522, the shared memory manager 116*a*, 116*z* returns the appropriate genre data from the string pool 616*a*, 616*z* to the requesting service 119*a*, 119*z*, 140*a*, 140*z*. The method 1500 then ends at step 1525. In another embodiment of the present invention, if the getgenre request uses a genrehandle, then steps 1507 and 1510 may be omitted.

Figure 16:
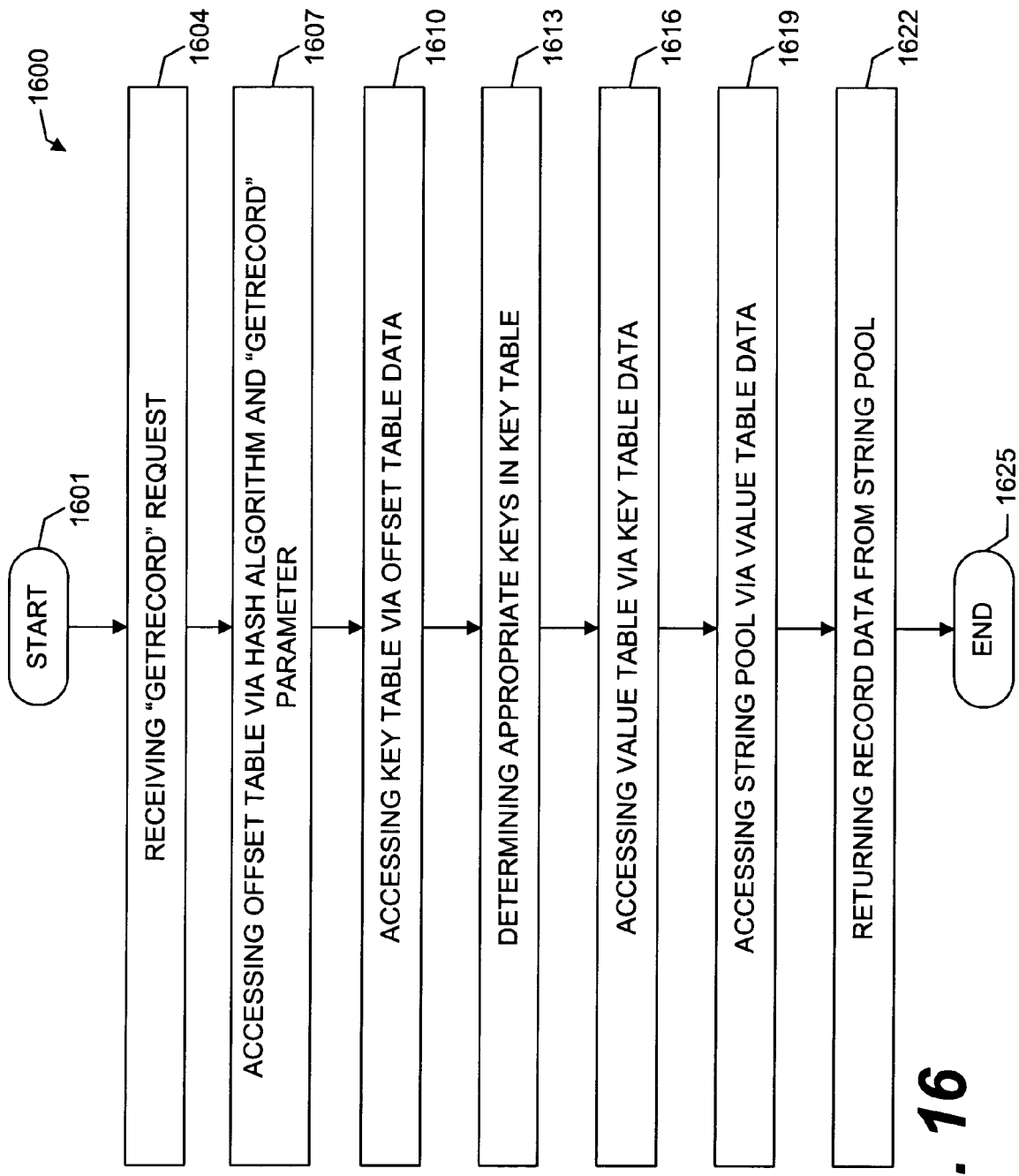
FIG. 16 displays a flowchart representation of a method of accessing record information in accordance with an exemplary embodiment of the present invention.

FIG. 16 displays a flowchart representation of a method of accessing record information 1600 in accordance with an exemplary embodiment of the present invention. After starting at step 1601, the method 1600 proceeds to step 1604 where the shared memory manager 116*a*, 116*z* receives a getrecord request from a service 119*a*, 119*z*, 140*a*, 140*z*. Next, at step 1607, the shared memory manager 116*a*, 116*z* accesses the offset table 607*a*, 607*z* by using a hash algorithm. The shared memory manager 116*a*, 116*z* may use a getrecord parameter (such as the genre name) to access the appropriate offset table 607*a*, 607*z* via the hash algorithm. Then, at step 1610, the shared memory manager 116*a*, 116*z* accesses the key table 610*a*, 610*z* via the offset data retrieved from the offset table 607*a*, 607*z*. The method 1600 then proceeds to step 1613 where the shared memory manager 116*a*, 116*z* determines the appropriate keys in the key table 610*a*, 610*z*. Next, at step 1616, the shared memory manager 116*a*, 116*z* accesses the corresponding values in the value table 613*a*, 613*z* based on the keys retrieved in the key table 610*a*, 610*z*. If the values in the value table 613*a*, 613*z* comprise of pointers that point to the string pool 616*a*, 616*z*, then the method 1600 proceeds to step 1619 where the shared memory manager 116*a*, 116*z* retrieves the appropriate data from the string pool 616*a*, 616*z* via the values retrieved from the value table 613*a*, 613*z*. Next, at step 1622, the shared memory manager 116*a*, 116*z* returns the appropriate record data from the string pool 616*a*, 616*z* to the requesting service 119*a*, 119*z*, 140*a*, 140*z*. The method 1600 then ends at step 1625. In another embodiment of the present invention, if the getrecord request uses a genrehandle, then steps 1607 and 1610 may be omitted.

Whereas the present invention has been described in detail it is understood that variations and modifications can be effected within the spirit and scope of the invention, as described herein before and as defined in the appended claims. The corresponding structures, materials, acts, and equivalents of all means plus function elements, if any, in the claims below are intended to include any structure, material, or acts for performing the functions in combination with other claimed elements as specifically claimed.

What is claimed is:

1. A method of managing a memory of a computer to share configuration information with a plurality of processes, the method comprising:
   (a) allocating a region of a memory of a computer for storing configuration information usable by at least one process of a plurality of processes, the region of memory being shareable with the plurality of processes;
   (b) receiving initial configuration information;
   (c) storing the initial configuration information in the region of memory;
   (d) receiving subsequent configuration information;
   (e) storing the subsequent configuration information without disturbing or impeding access by the plurality of processes to the initial configuration information already stored in the region of memory, wherein storing the subsequent configuration information further comprises determining whether the subsequent configuration information comprises information constituting a revision of at least one portion of the initial configuration information and if so, copying at least one portion of the initial configuration information that is not revised by the subsequent configuration information to a previously unused portion of the region of memory appropriate for the type of value of the at least one portion of the initial configuration information and inserting the subsequent configuration information at an appropriate memory location relative to the copied portions of the initial configuration information; and
   (f) after storing the subsequent configuration information, making the subsequent configuration information accessible to the at least one process of the plurality of processes.

2. The method of claim 1, further comprising associating revision level data with the subsequent configuration information indicating that the subsequent configuration information has been more recently stored in the region of memory than the initial configuration information.

3. The method of claim 2, further comprising providing the revision level data associated with the subsequent configuration information to the at least one process of the plurality of processes to enable the at least one process to determine whether the process is presently using the most recently stored configuration information.

4. The method of claim 1, wherein the step (f) of making the subsequent configuration information accessible includes changing a pointer to direct the at least one process to the stored subsequent configuration information instead of the stored initial configuration information.

5. The method of claim 1, wherein the method further includes a step (g) of, after receiving subsequent configuration information, determining whether the region of memory has sufficient capacity to store the subsequent configuration information or does not have sufficient capacity to store the subsequent configuration information.

6. The method of claim 5, wherein the region of memory comprises a first region of memory, and further comprising:
upon determining that the first region of memory does not have sufficient capacity to store the subsequent configuration information, allocating a second region of a memory of the computer for storing the subsequent configuration information; and
wherein storing the subsequent configuration information includes storing the subsequent configuration information in the second region of memory.

7. The method of claim 6, further comprising, after storing the subsequent configuration information in the second region of memory, updating validity data associated with the first region of memory to indicate that the first region of memory no longer contains valid configuration information for use by the at least one process of the plurality of processes.

8. The method of claim 7, further comprising, after updating validity data, providing the validity data associated with the first region of memory to the at least one process of the plurality of processes to enable the at least one process to determine whether the process is presently using valid configuration information.

9. The method of claim 6, further comprising, after storing the subsequent configuration information in the second region of memory, storing a pointer in the memory of the computer which points to the second region of memory.

10. The method of claim 9, wherein the subsequent configuration information corresponds to a particular configuration parameter having a unique identifier, and further comprising associating the unique identifier and the stored pointer pointing to the second region of memory.

11. The method of claim 10, wherein the particular configuration parameter includes a port.

12. The method of claim 10, wherein the particular configuration parameter includes a genre.

13. The method of claim 1, wherein step (c) of storing the initial configuration information includes determining whether storage of the initial configuration information requires the storage of a character string value and if so, storing the character string value in a sub-region of the region of memory dedicated to the storage of character strings.

14. The method of claim 13, wherein step (c) of storing the initial configuration information further includes, after storing the character string value, establishing pointers in at least one other sub-region of the region of memory which enable the at least one process of the plurality of processes to read the character string value.

15. The method of claim 1, wherein step (c) of storing the initial configuration information includes determining whether storage of the initial configuration information requires the storage of a numeric value and if so, storing the numeric value in a sub-region of the region of memory dedicated to the storage of numeric values and of pointers to character string values.

16. The method of claim 15, wherein step (c) of storing the initial configuration information further includes, after storing the numeric value, establishing pointers in at least one other sub-region of the region of memory which enable the at least one process of the plurality of processes to read the numeric value.

17. The method of claim 1, wherein if the type of value of the at least one portion of the initial configuration information corresponds to a character string, the previously unused portion of the region of memory appropriate for the type of value of the at least one portion of the initial configuration information includes a sub-region of the region of memory dedicated to the storage of character string values.

18. The method of claim 1, wherein if the type of value of the at least one portion of the initial configuration information corresponds to a number, the previously unused portion of the region of memory appropriate for the type of value of the at least one portion of the initial configuration information includes a sub-region of the region of memory dedicated to the storage of numeric values.

19. The method of claim 1, wherein the region of memory is a first region of memory for storing configuration information associated with a first configuration parameter of a first type, and further comprising allocating a second region of memory for storing configuration information associated with a second configuration parameter of a second type.

20. The method of claim 19, wherein the first type comprises a poll.

21. The method of claim 19, wherein the second type comprises a genre.

22. The method of claim 1, wherein the particular configuration parameter constitutes a port.

23. The method of claim 1, wherein the particular configuration parameter constitutes a genre.

24. The method of claim 1, wherein the processes of the plurality of processes are executable only at the computer.

25. The method of claim 1, wherein the region of memory includes a contiguous region of memory.

26. The method of claim 1, wherein the initial configuration information pertains to a particular configuration parameter, and wherein the subsequent configuration information pertains to the same particular configuration parameter.

27. A computer-readable storage medium which stores a set of instructions which when executed performs a method for managing a memory of a computer to share configuration information with a plurality of processes, the method executed by the set of instructions comprising:
(a) allocating a region of a memory of a computer for storing configuration information usable by at least one process of a plurality of processes, the region of memory being shareable with the plurality of processes;
(b) receiving initial configuration information;
(c) storing the initial configuration information in the region of memory;
(d) receiving subsequent configuration information;
(e) storing the subsequent configuration information without disturbing or impeding access by the plurality of processes to the initial configuration information already stored in the region of memory, wherein storing the subsequent configuration information further comprises determining whether the subsequent configuration information comprises information constituting a revision of at least one portion of the initial configuration information and if so, copying at least one portion of the initial configuration information that is not revised by the subsequent configuration information to a previously unused portion of the region of memory appropriate for the type of value of the at least one portion of the initial configuration information and inserting the subsequent configuration information at an appropriate memory location relative to the copied portions of the initial configuration information; and (f) make the subsequent configuration information accessible to the at least one process of the plurality of processes after storing the subsequent configuration information.

28. A system for managing a memory of a computer to share configuration information with a plurality of processes, the system comprising:

a memory storage; and a processing unit coupled to the memory storage, wherein the processing unit is operative to:

(a) allocate a region of a memory of a computer for storing configuration information usable by at least one process of a plurality of processes, the region of memory being shareable with the plurality of processes;

(b) receive initial configuration information;

(c) store the initial configuration information in the region of memory;

(d) receive subsequent configuration information;

(e) store the subsequent configuration information without disturbing or impeding access by the plurality of processes to the initial configuration information already stored in the region of memory, wherein the processing unit being operative to store the subsequent configuration information further comprises the processing unit being operative to determine whether the subsequent configuration information comprises information constituting a revision of at least one portion of the initial configuration information and if so, copying at least one portion of the initial configuration information that is not revised by the subsequent configuration information to a previously unused portion of the region of memory appropriate for the type of value of the at least one portion of the initial configuration information and inserting the subsequent configuration information at an appropriate memory location relative to the copied portions of the initial configuration information; and (f) after store the subsequent configuration information, making the subsequent configuration information accessible to the at least one process of the plurality of processes.

* * * * *